(12) United States Patent
Joshi et al.

(10) Patent No.: US 11,381,675 B2
(45) Date of Patent: Jul. 5, 2022

(54) COMMAND BASED INTERACTIVE SYSTEM AND A METHOD THEREOF

(71) Applicant: Samsung Electronics Co., Ltd., Suwon-si (KR)

(72) Inventors: Milind Joshi, Noida (IN); Shashank Saurabh, Noida (IN); Shivani Aggarwal, Noida (IN)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/413,280

(22) PCT Filed: Dec. 12, 2019

(86) PCT No.: PCT/KR2019/017642
§ 371 (c)(1),
(2) Date: Jun. 11, 2021

(87) PCT Pub. No.: WO2020/130498
PCT Pub. Date: Jun. 25, 2020

(65) Prior Publication Data
US 2022/0021762 A1     Jan. 20, 2022

(30) Foreign Application Priority Data
Dec. 12, 2018 (IN) .............................. 201811046989

(51) Int. Cl.
*H04M 1/72454* (2021.01)
*H04M 1/72433* (2021.01)
*H04M 1/72436* (2021.01)

(52) U.S. Cl.
CPC ... *H04M 1/72454* (2021.01); *H04M 1/72433* (2021.01); *H04M 1/72436* (2021.01); *H04M 2250/74* (2013.01)

(58) Field of Classification Search
CPC ......... H04M 1/72454; H04M 1/72433; H04M 1/72436; H04M 1/642; H04M 1/663;
(Continued)

(56) References Cited

U.S. PATENT DOCUMENTS 7,372,952 B1* 5/2008 Wu ..................... H04M 3/5233
379/265.11
7,515,699 B2  4/2009 Cooper et al.
(Continued)

FOREIGN PATENT DOCUMENTS

KR  10-2014-0082423 A  7/2014
WO  2017/158363 A1    9/2017

OTHER PUBLICATIONS

Zhu et al. "Generative Visual Manipulation on the Natural Image Manifold", Sep. 25, 2016.
(Continued)

*Primary Examiner* — Farid Seyedvosoghi
(74) *Attorney, Agent, or Firm* — Jefferson IP Law, LLP

(57) ABSTRACT

The disclosure discloses a command based interactive system (100) and a method thereof. The system (100) includes an electronic device (102) and an AI engine (108). The electronic device (102) includes a detection module (206), a switching module (208), and a recording module (210). The detection module (206) detects a call and a user input, first context data of the call, and/or pre-setting information. The switching module (208) enables the electronic device (102) to receive a command from the user. The recording module (210) records the command. The AI engine (108) includes an analyser (222), and a communication module (226). The analyzer (222) analyzes the command, and generates conversational threads based on the analysed command. The communication module (226) transmits the conversational threads to the caller.

20 Claims, 21 Drawing Sheets

(58) Field of Classification Search
CPC ......... H04M 1/72403; H04M 2250/74; H04M 2250/12; H04M 2201/34; H04M 2201/36; H04M 2201/38; G06F 3/167
See application file for complete search history.

(56) References Cited

U.S. PATENT DOCUMENTS

| | | | | |
|---|---|---|---|---|
| 8,565,396 | B1* | 10/2013 | Oliver | H04M 1/663 |
| | | | | 379/144.03 |
| 2010/0134490 | A1 | 6/2010 | Corazza et al. | |
| 2012/0265528 | A1* | 10/2012 | Gruber | G10L 15/18 |
| | | | | 704/235 |
| 2013/0021176 | A1* | 1/2013 | Tu | H04W 4/40 |
| | | | | 455/412.2 |
| 2014/0179281 | A1* | 6/2014 | Kim | H04M 3/53391 |
| | | | | 455/414.1 |
| 2015/0045003 | A1* | 2/2015 | Vora | H04M 3/42042 |
| | | | | 455/412.2 |
| 2015/0088514 | A1 | 3/2015 | Typrin | |
| 2015/0350151 | A1 | 12/2015 | Graham et al. | |
| 2016/0065711 | A1 | 3/2016 | De Carney | |
| 2016/0255200 | A1 | 9/2016 | Awad et al. | |
| 2017/0031556 | A1 | 2/2017 | Yang et al. | |

OTHER PUBLICATIONS

Gregor et al. DRAW: A Recurrent Neural Network For Image Generation, May 20, 2015.
Indian Search Report dated Aug. 18, 2020, issued in Indian Application No. 201811046989.

* cited by examiner

[Fig. 1]
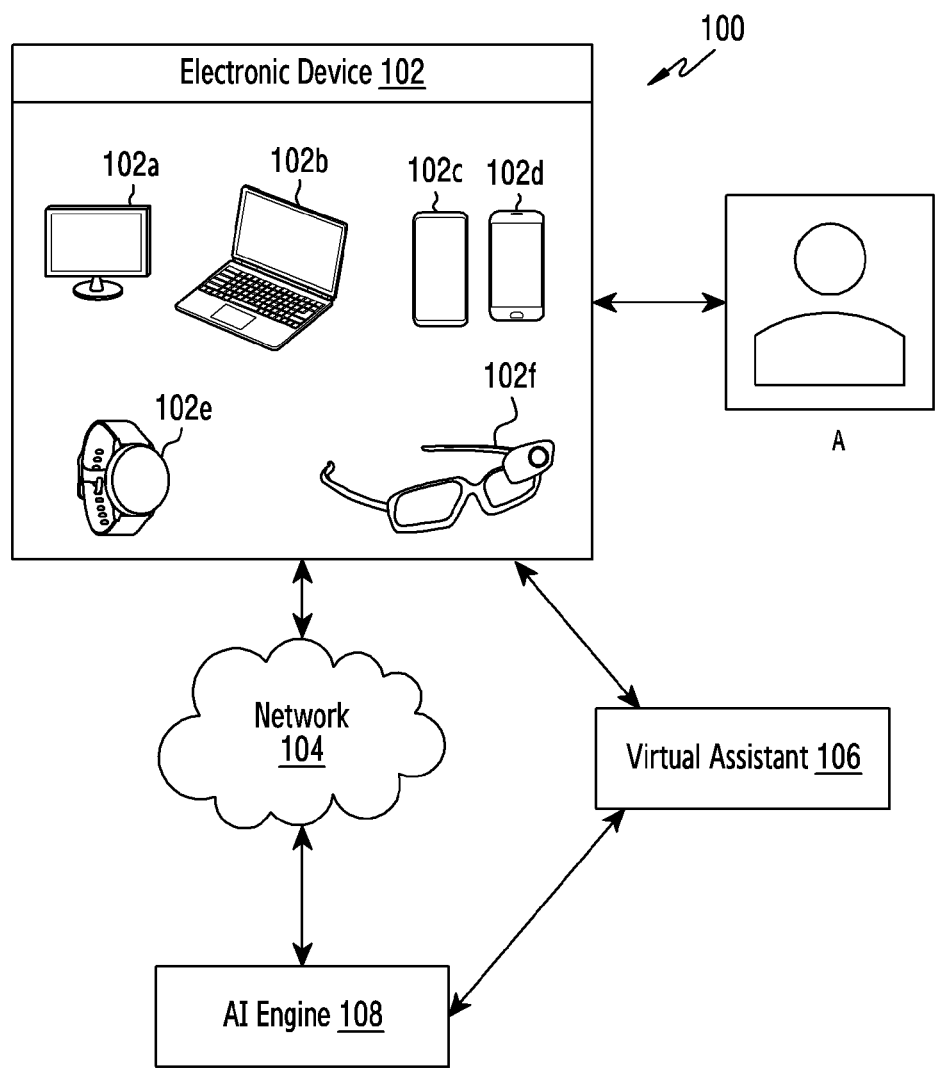

[Fig. 2]
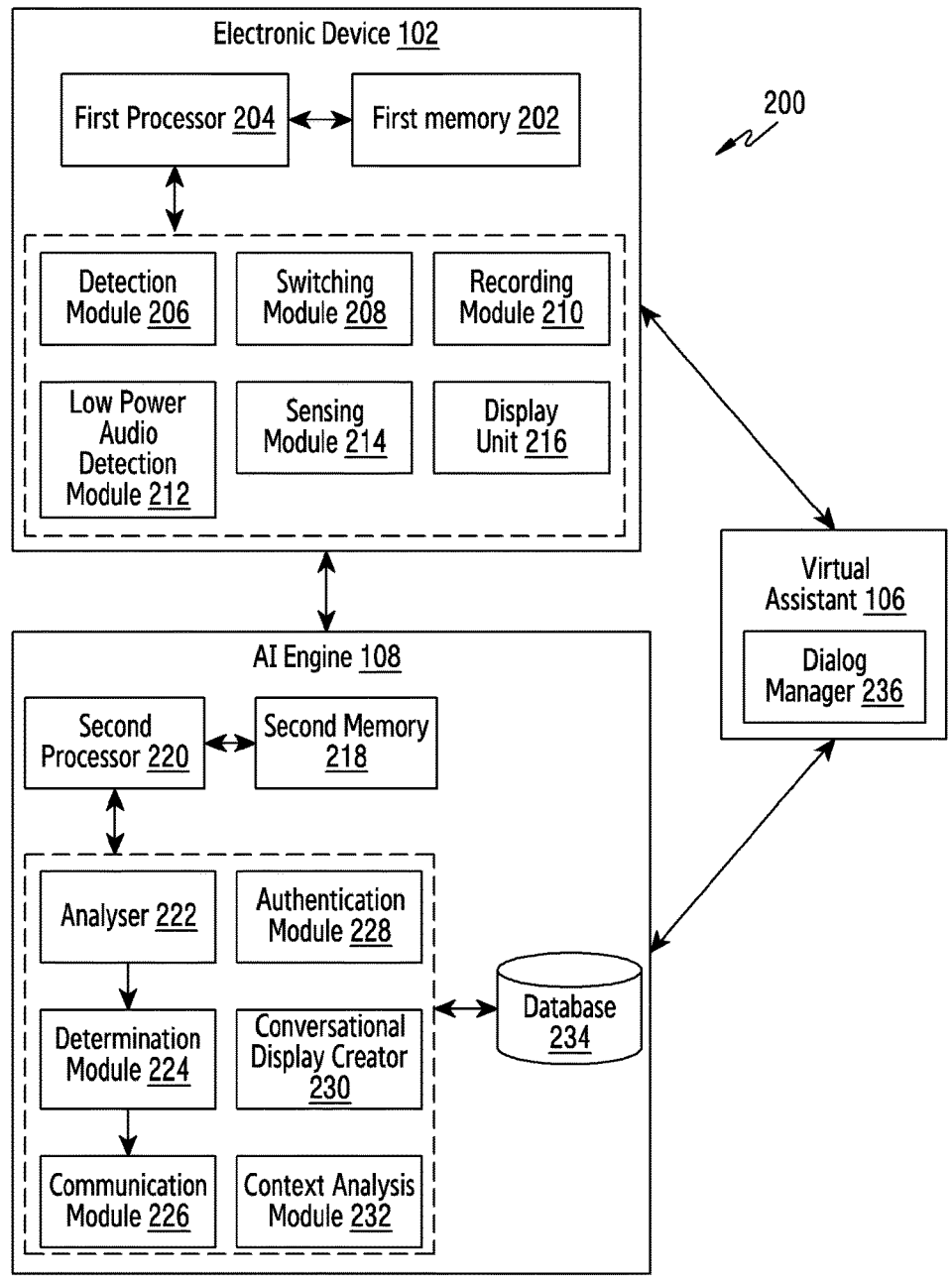
[Fig. 3]
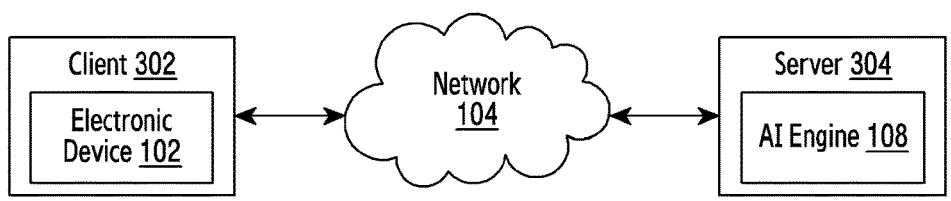

[Fig. 4]
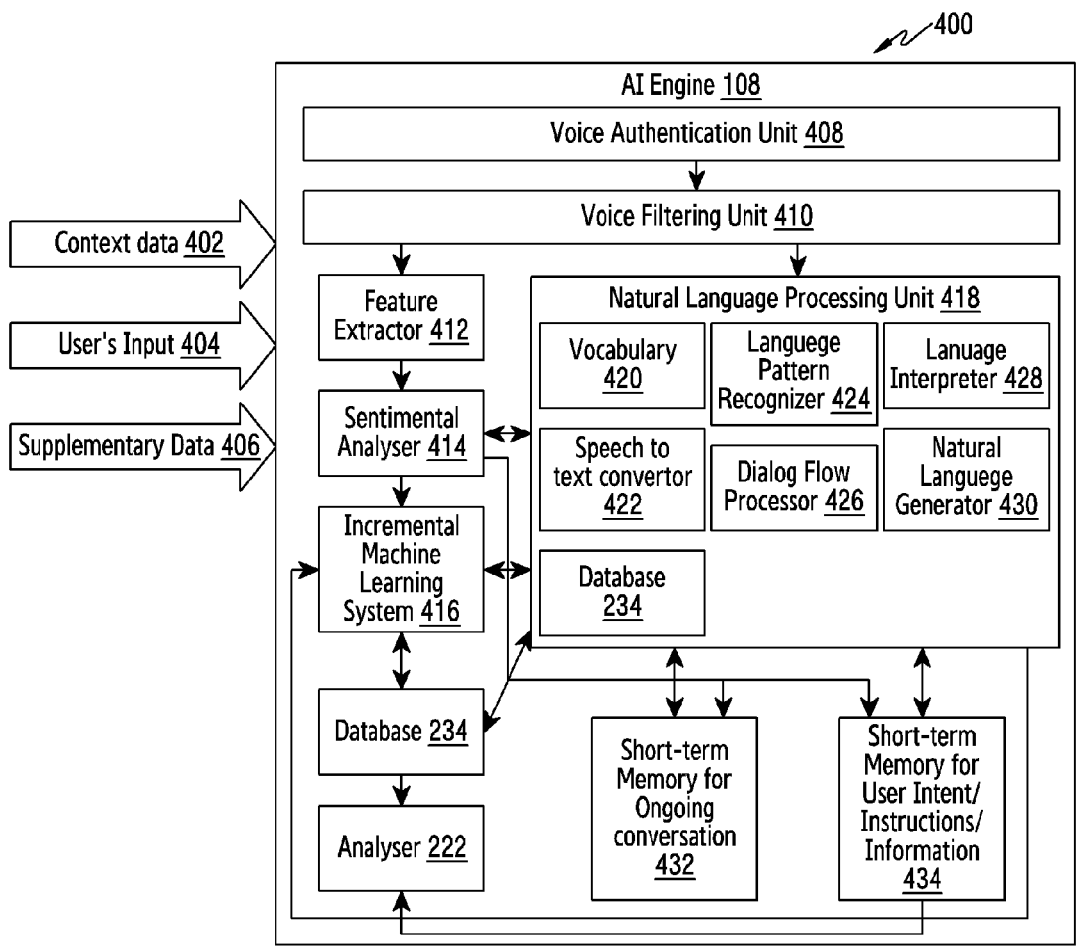

[Fig. 5]
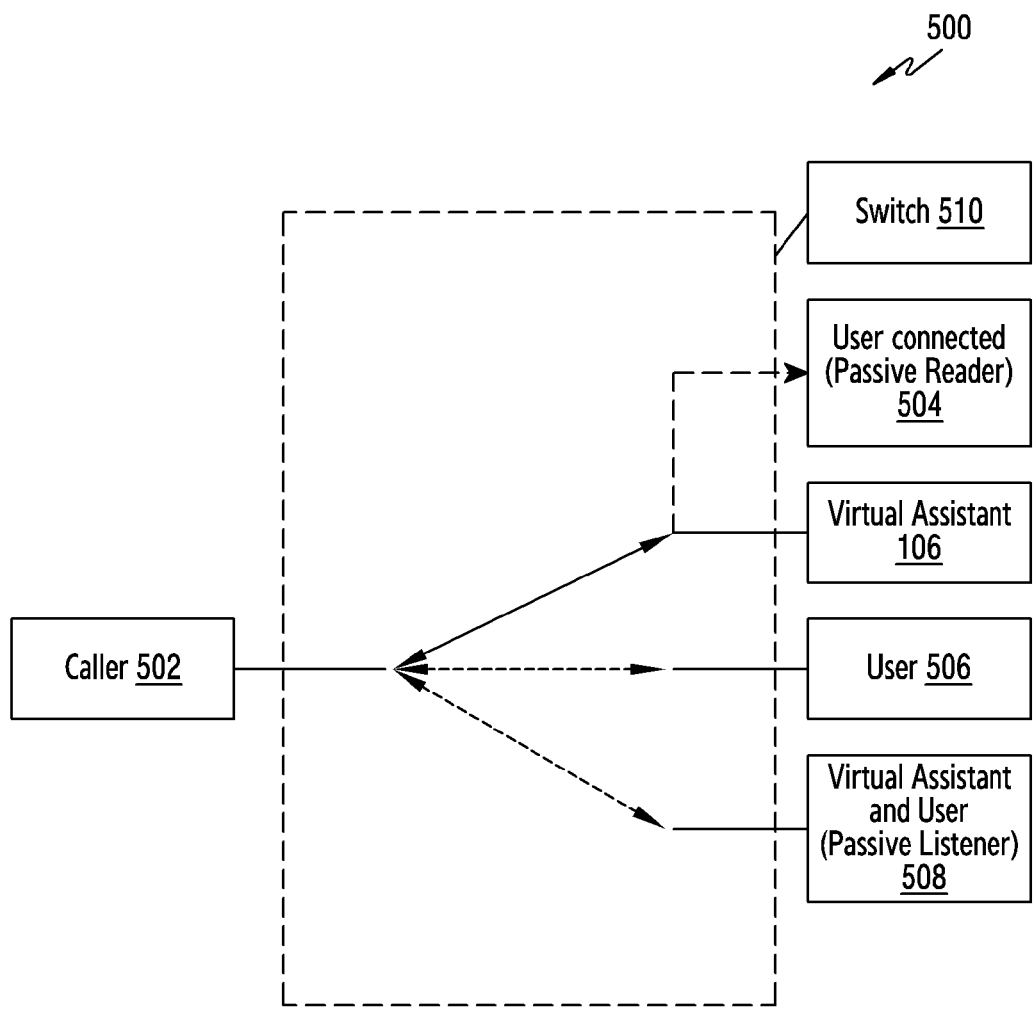

[Fig. 6]
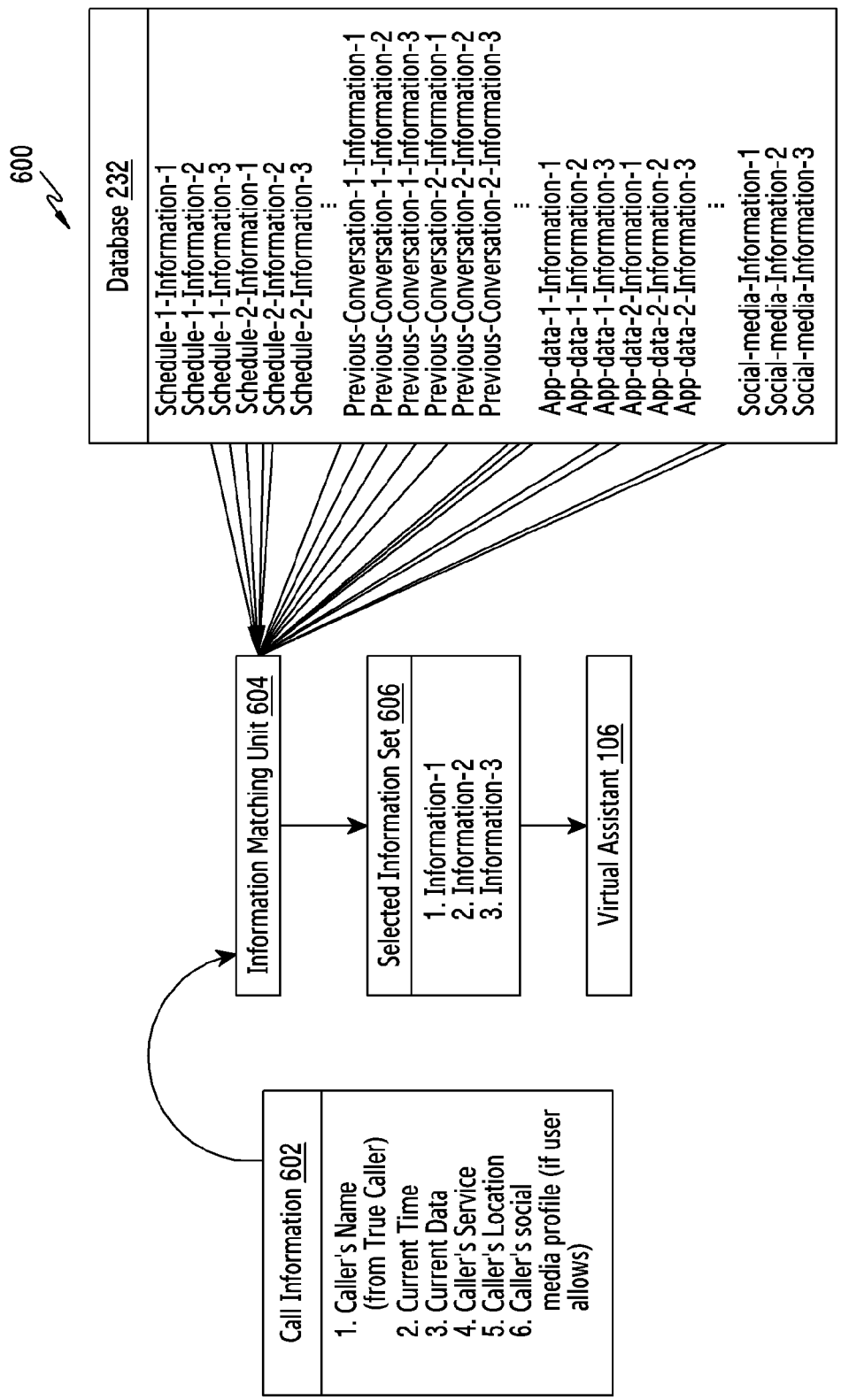

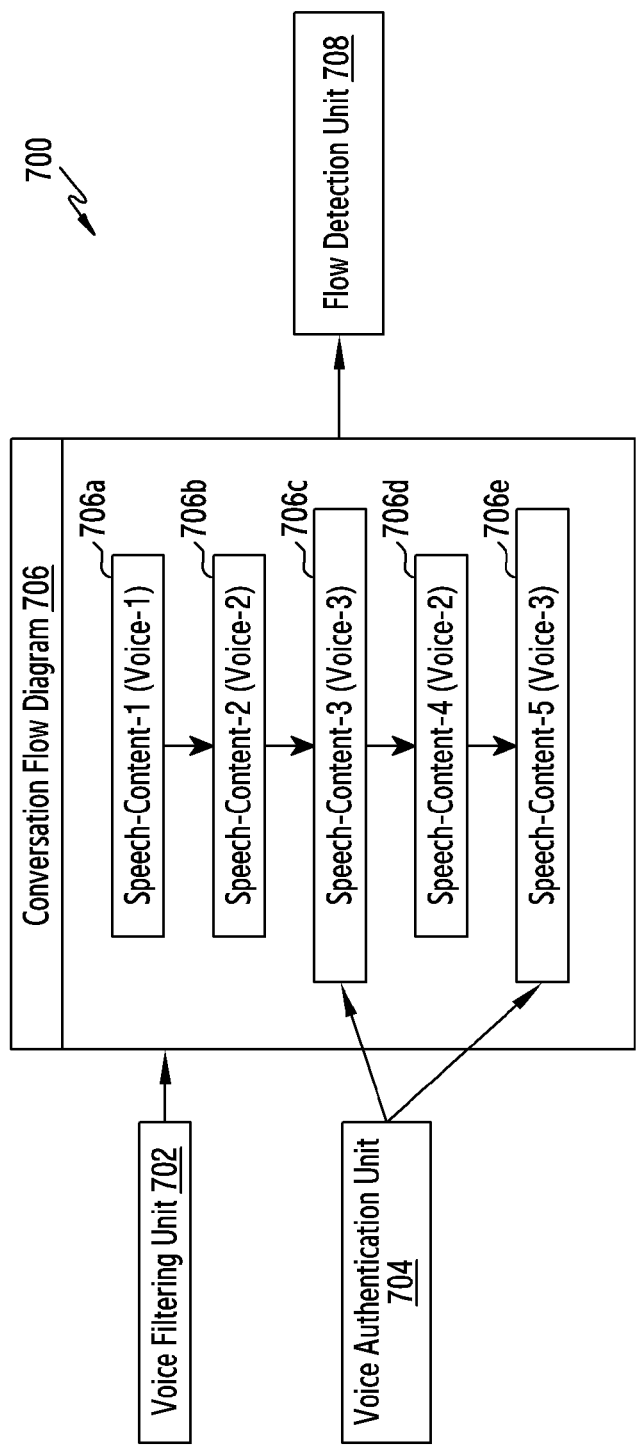
[Fig. 7]

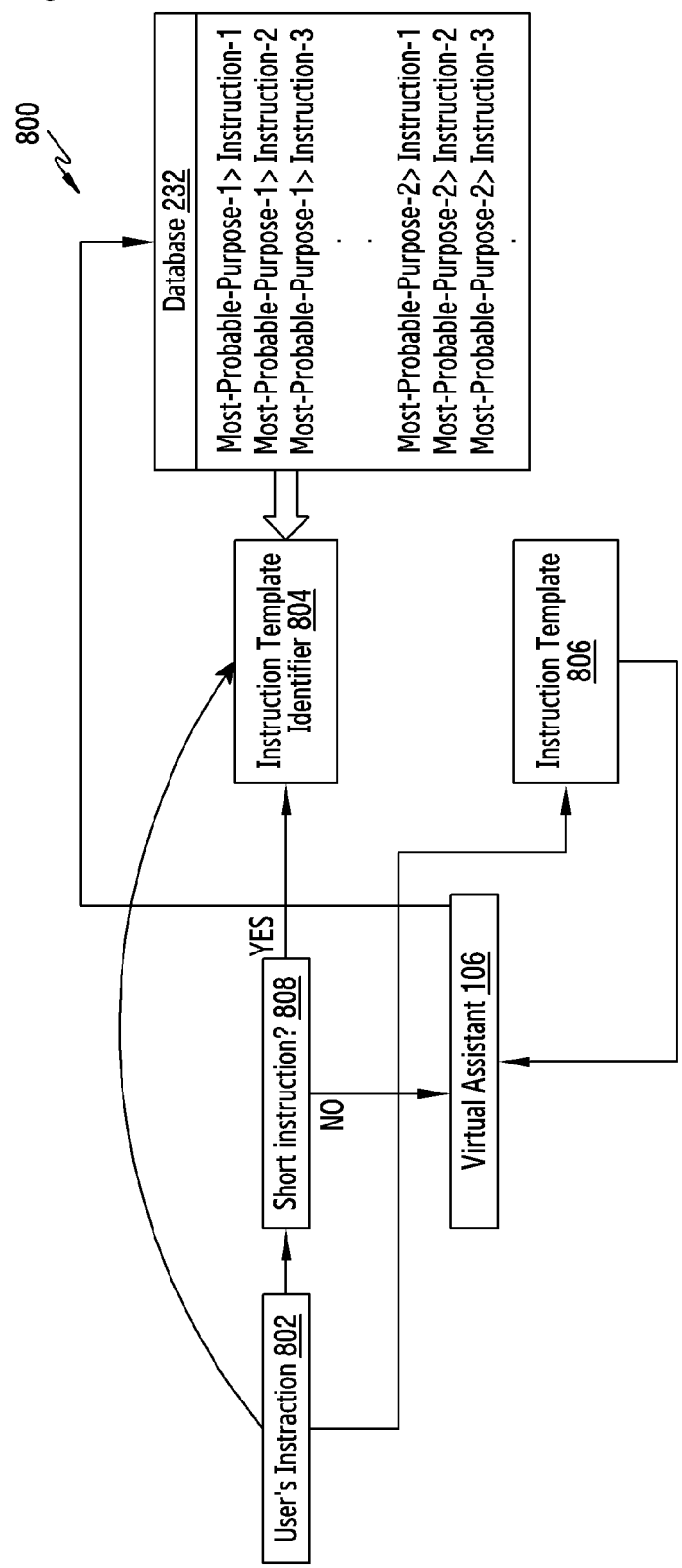

[Fig. 9]
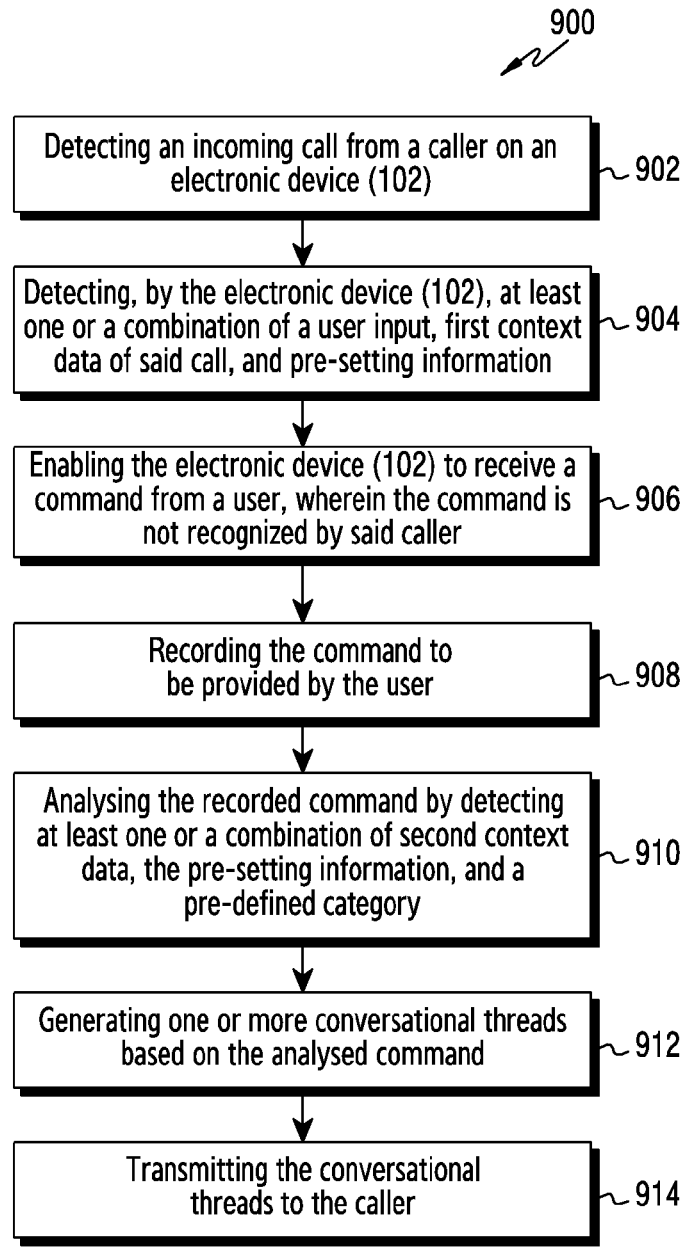

[Fig. 10]
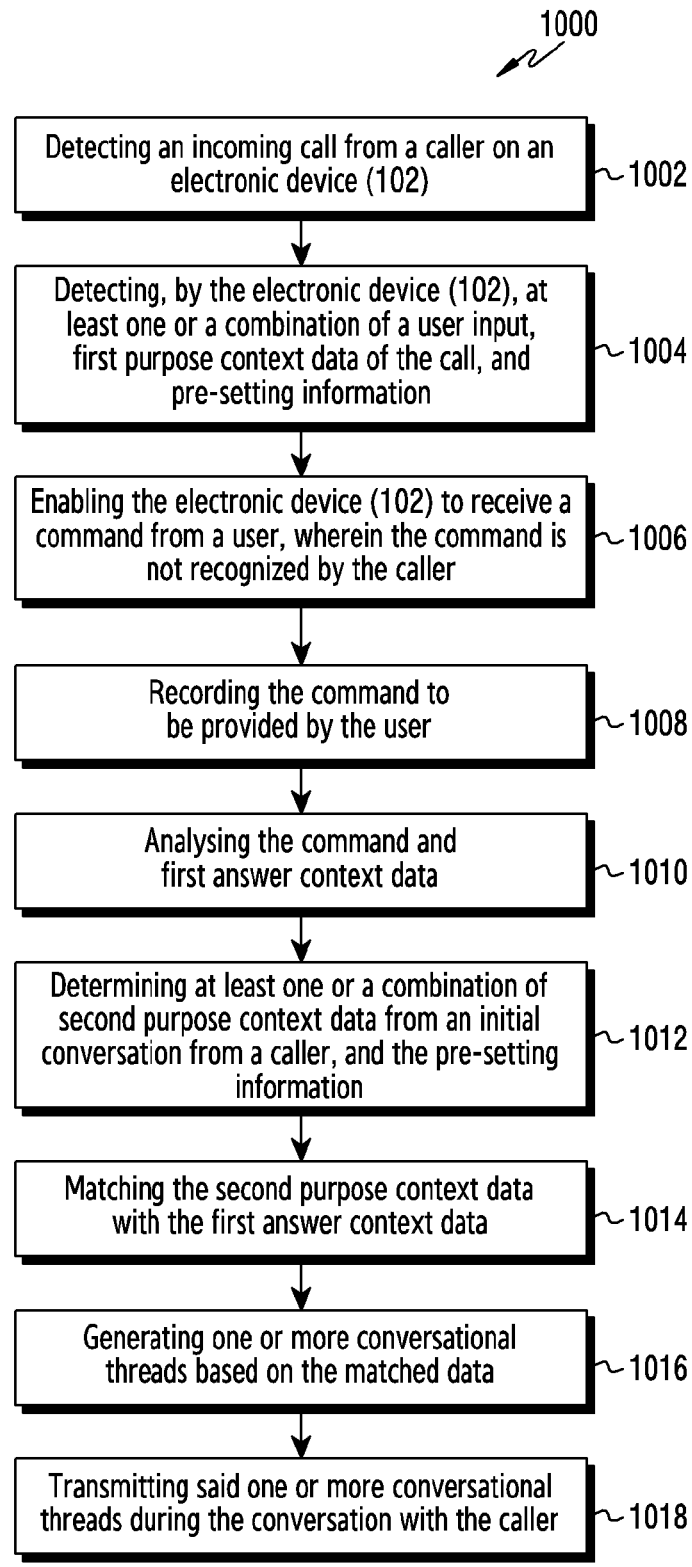

[Fig. 11]
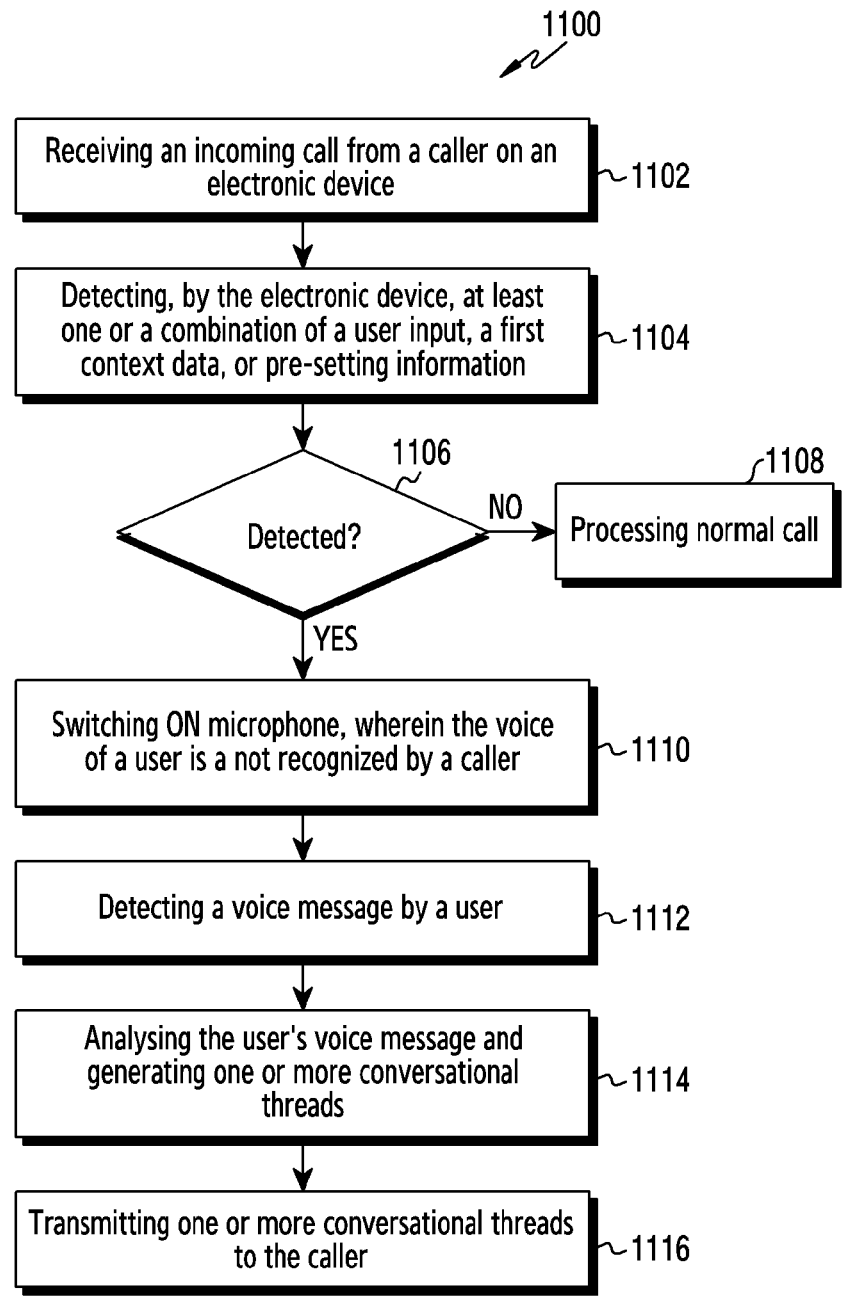

[Fig. 12]
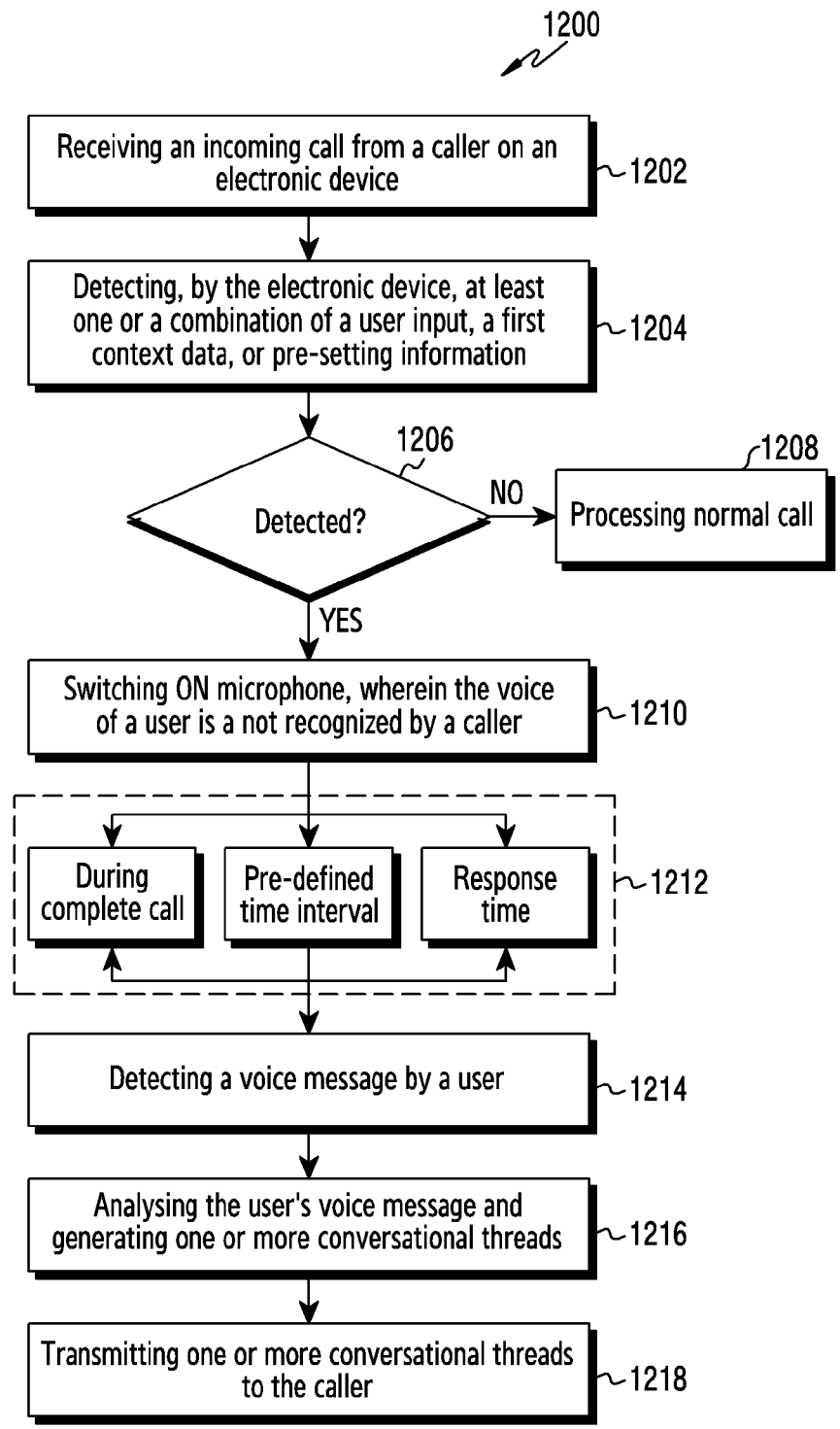

[Fig. 13]
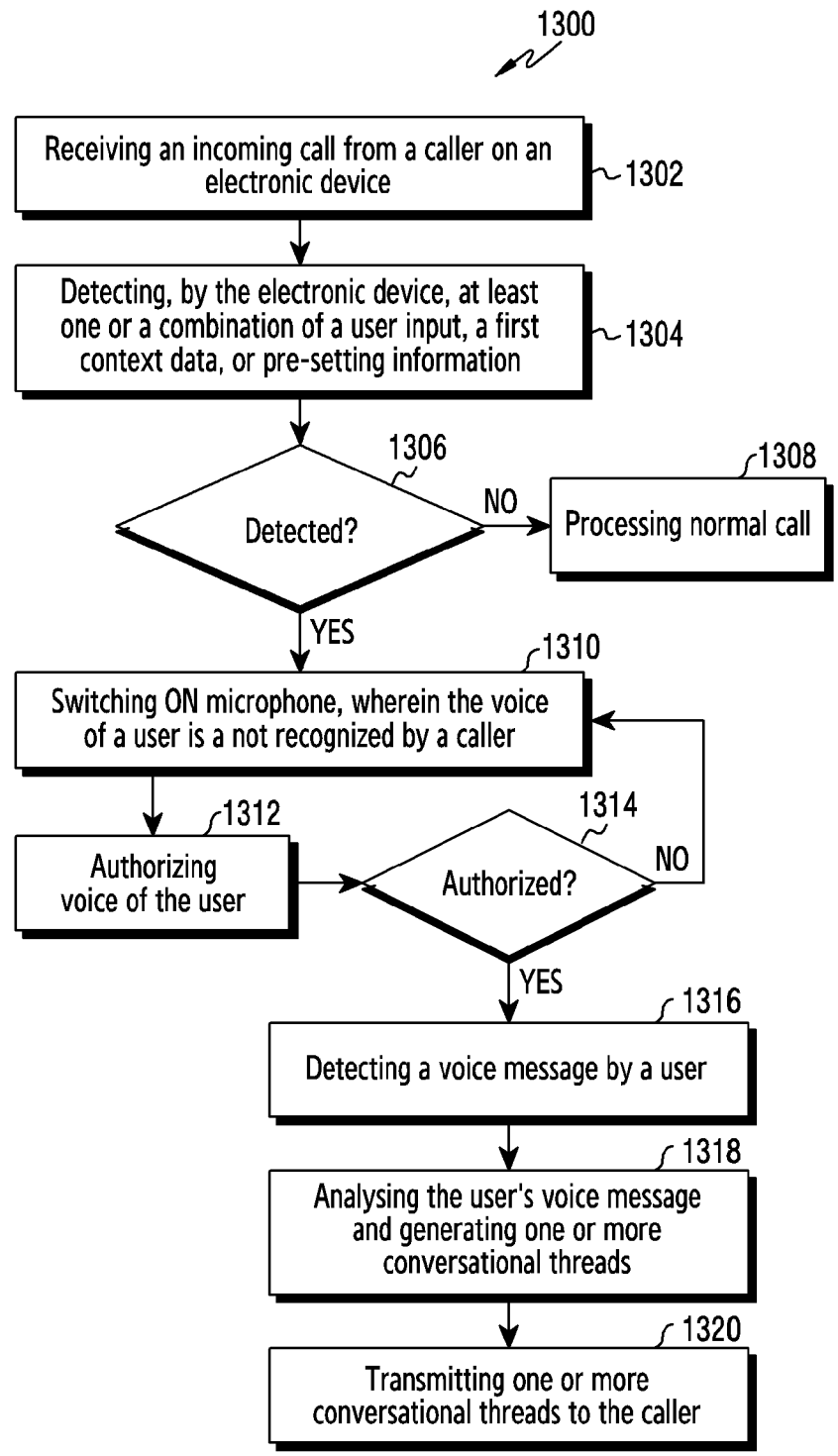

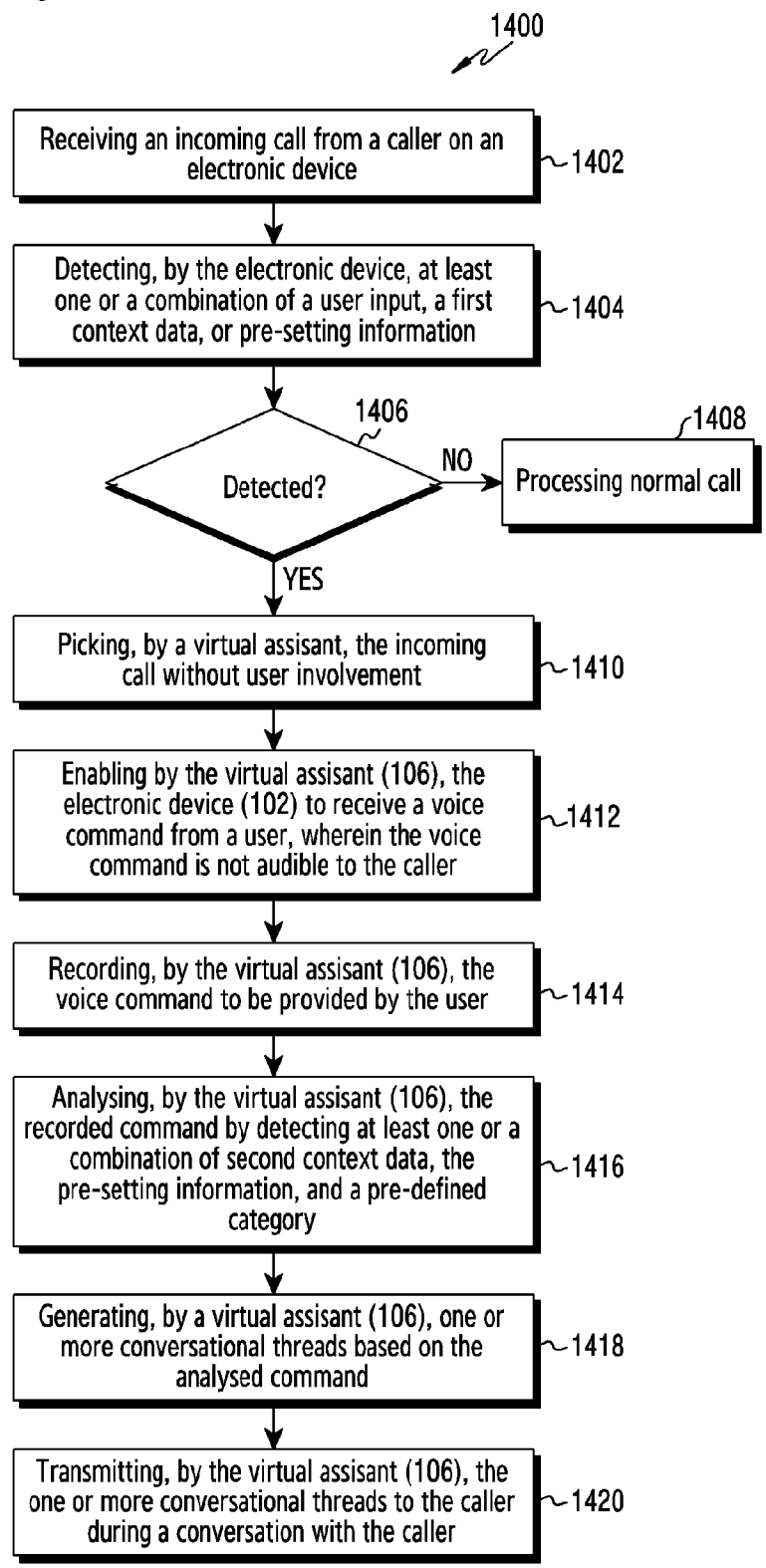
[Fig. 14]

[Fig. 15]
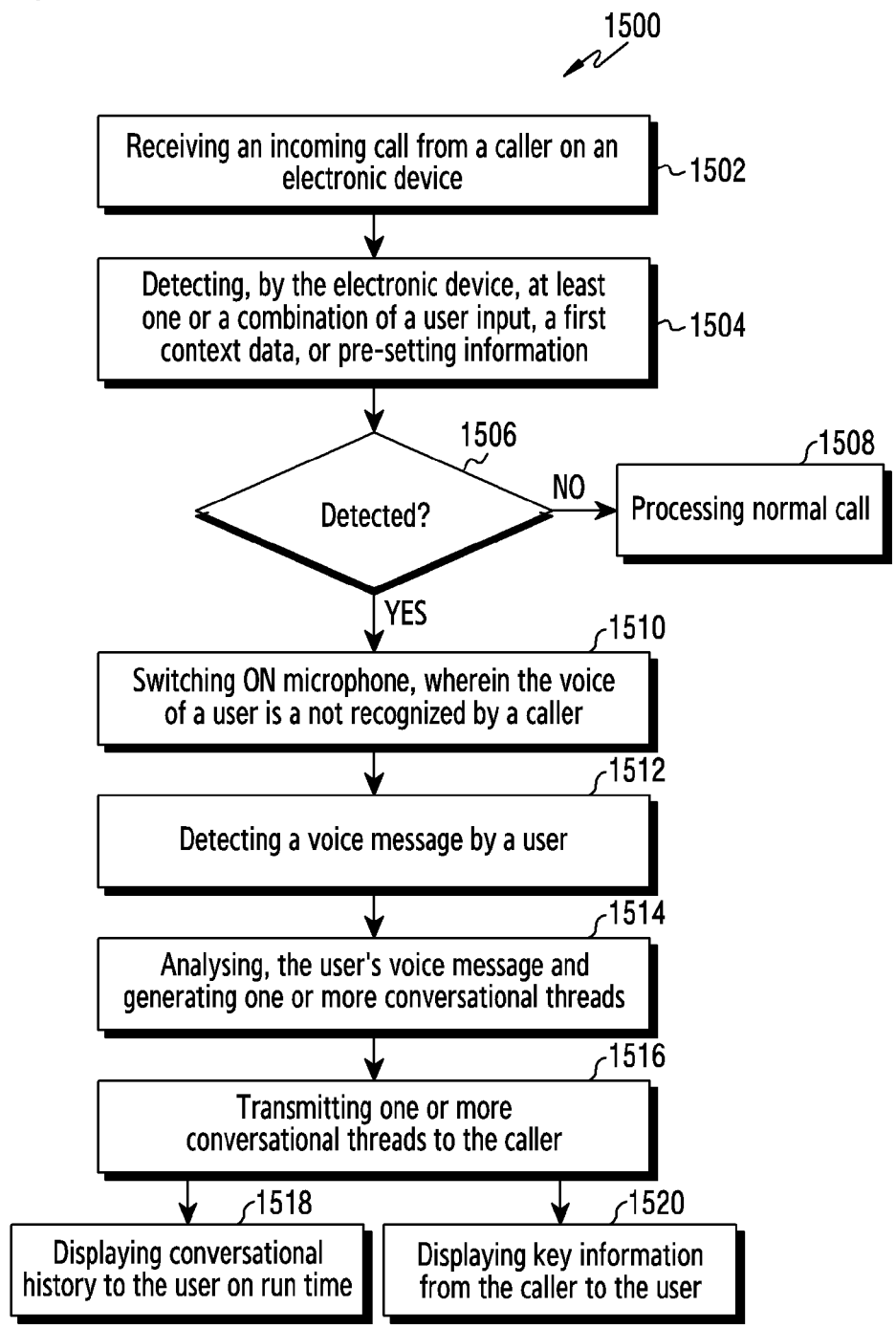

[Fig. 16]
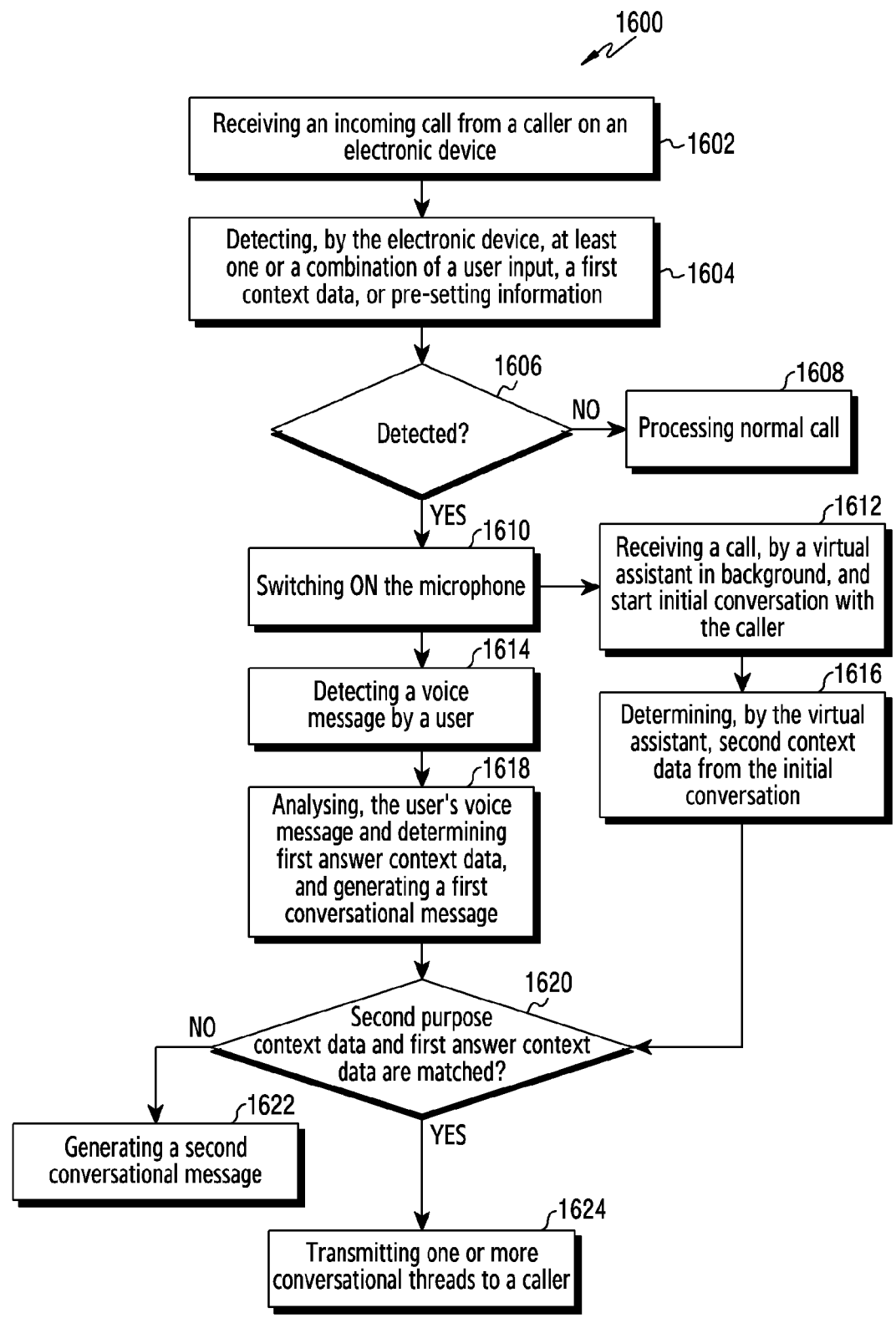

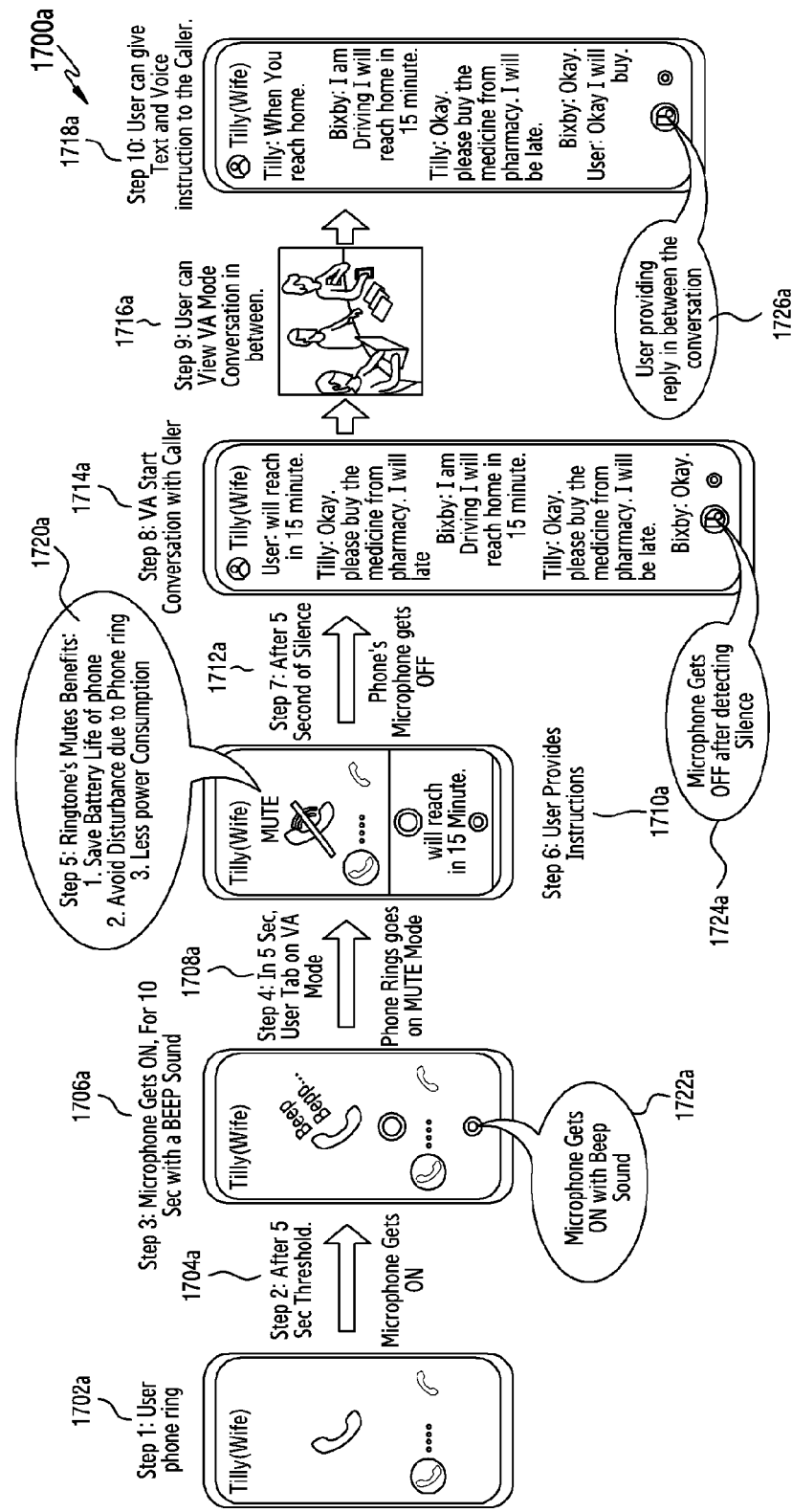

[Fig. 17B]
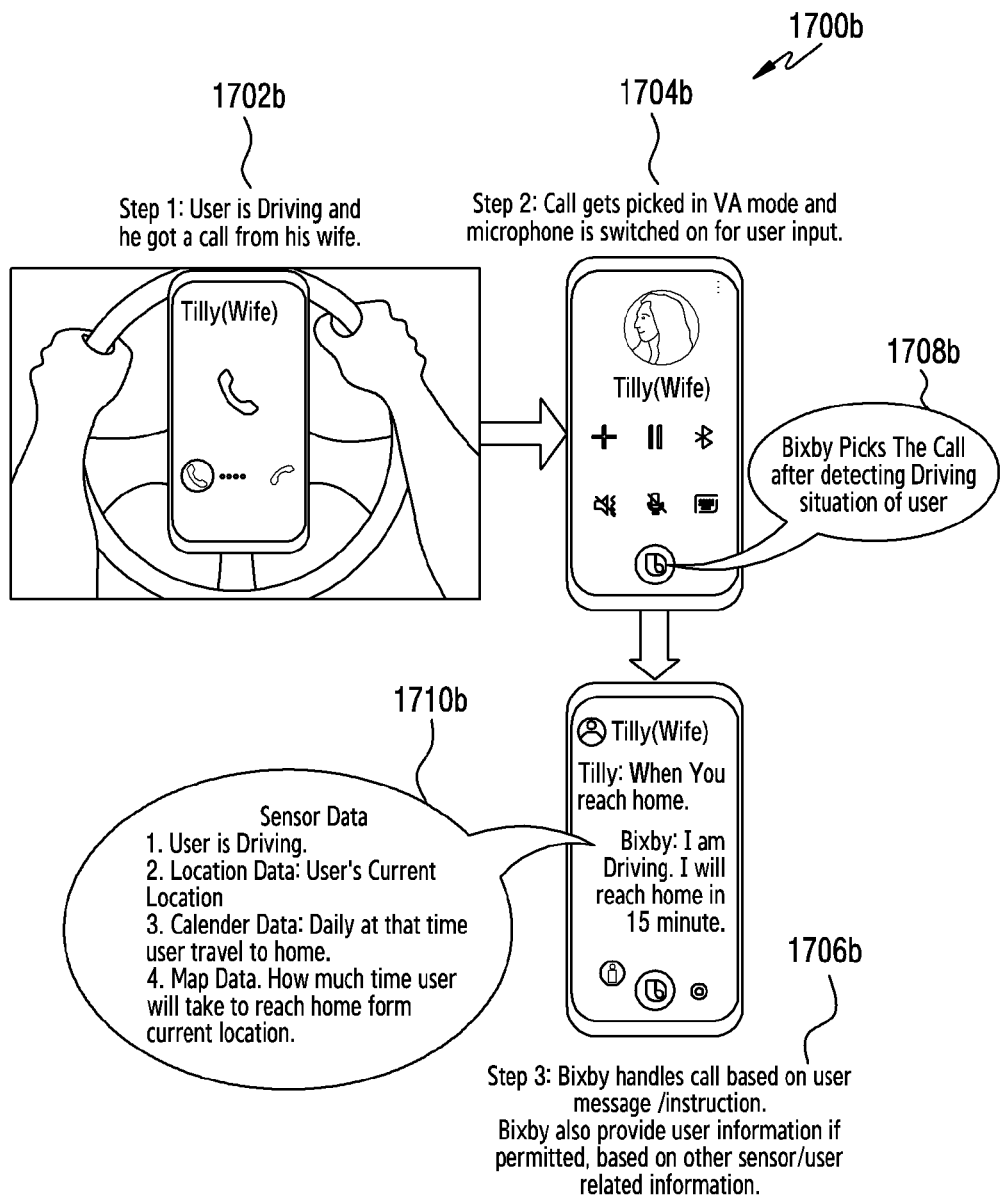

[Fig. 17C]
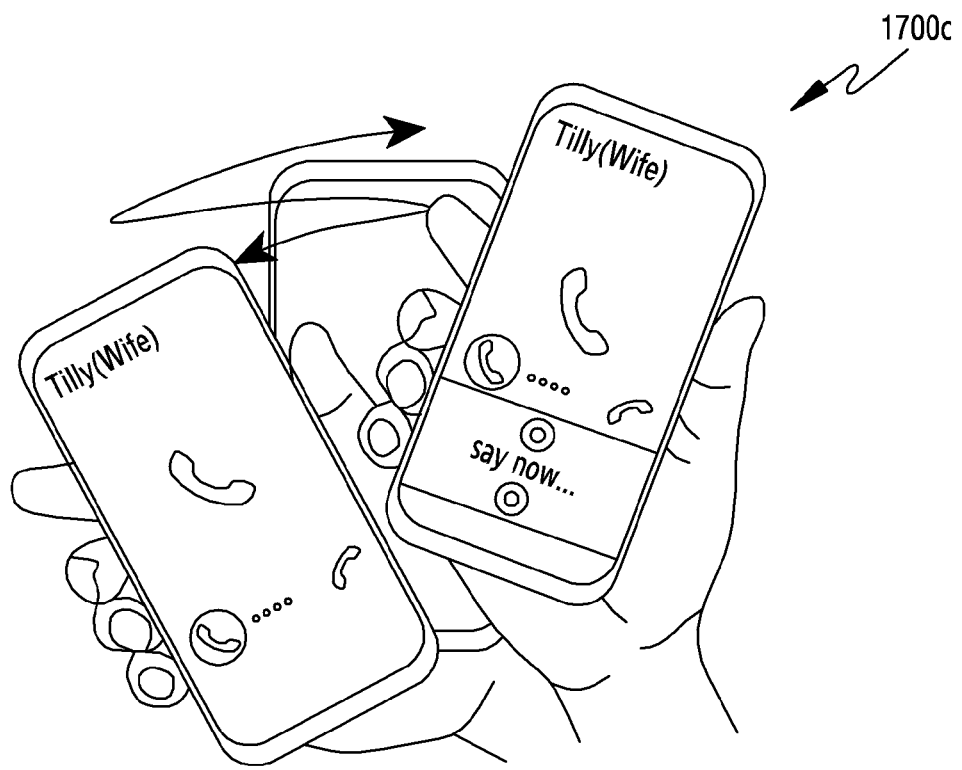

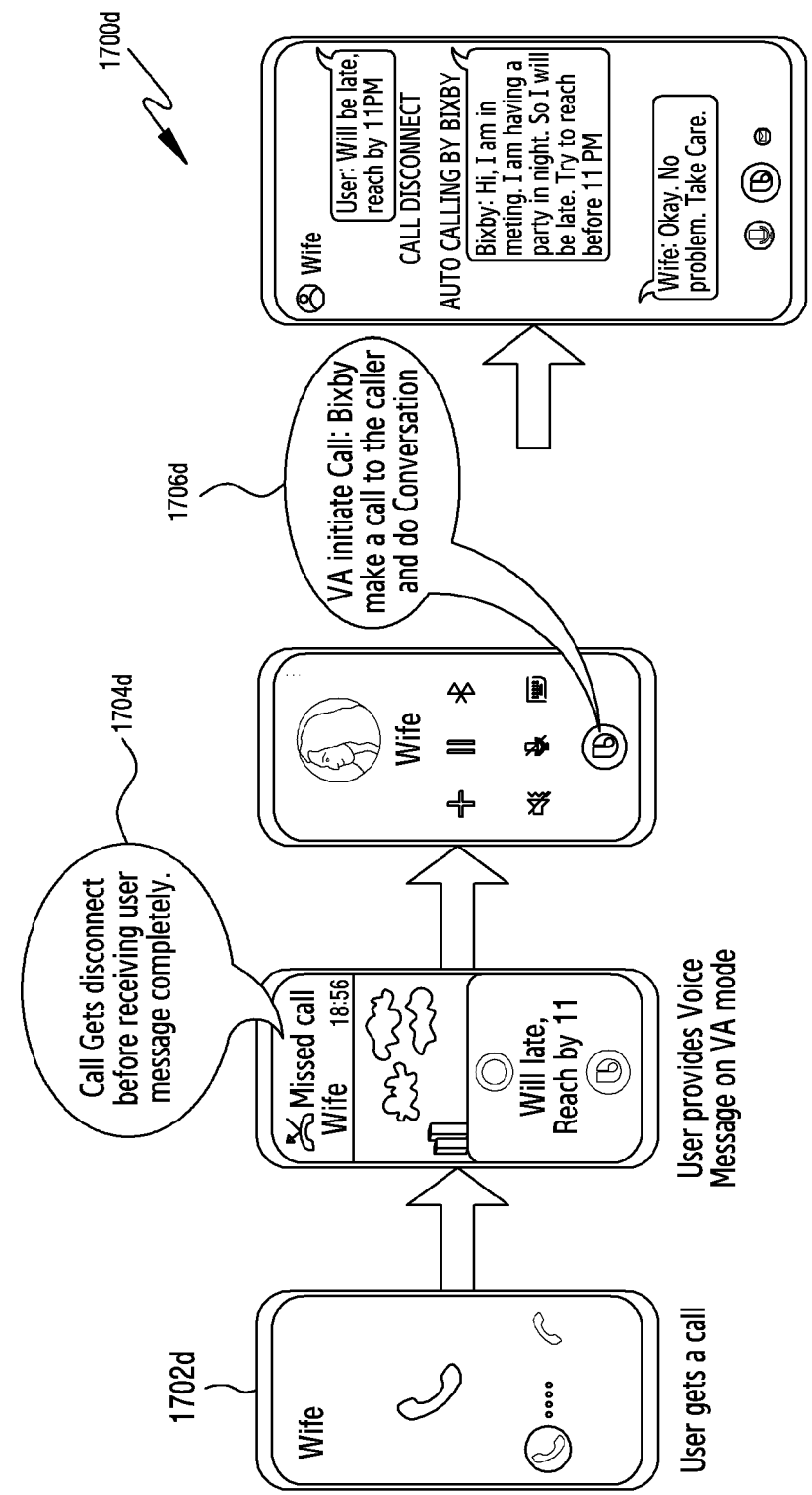

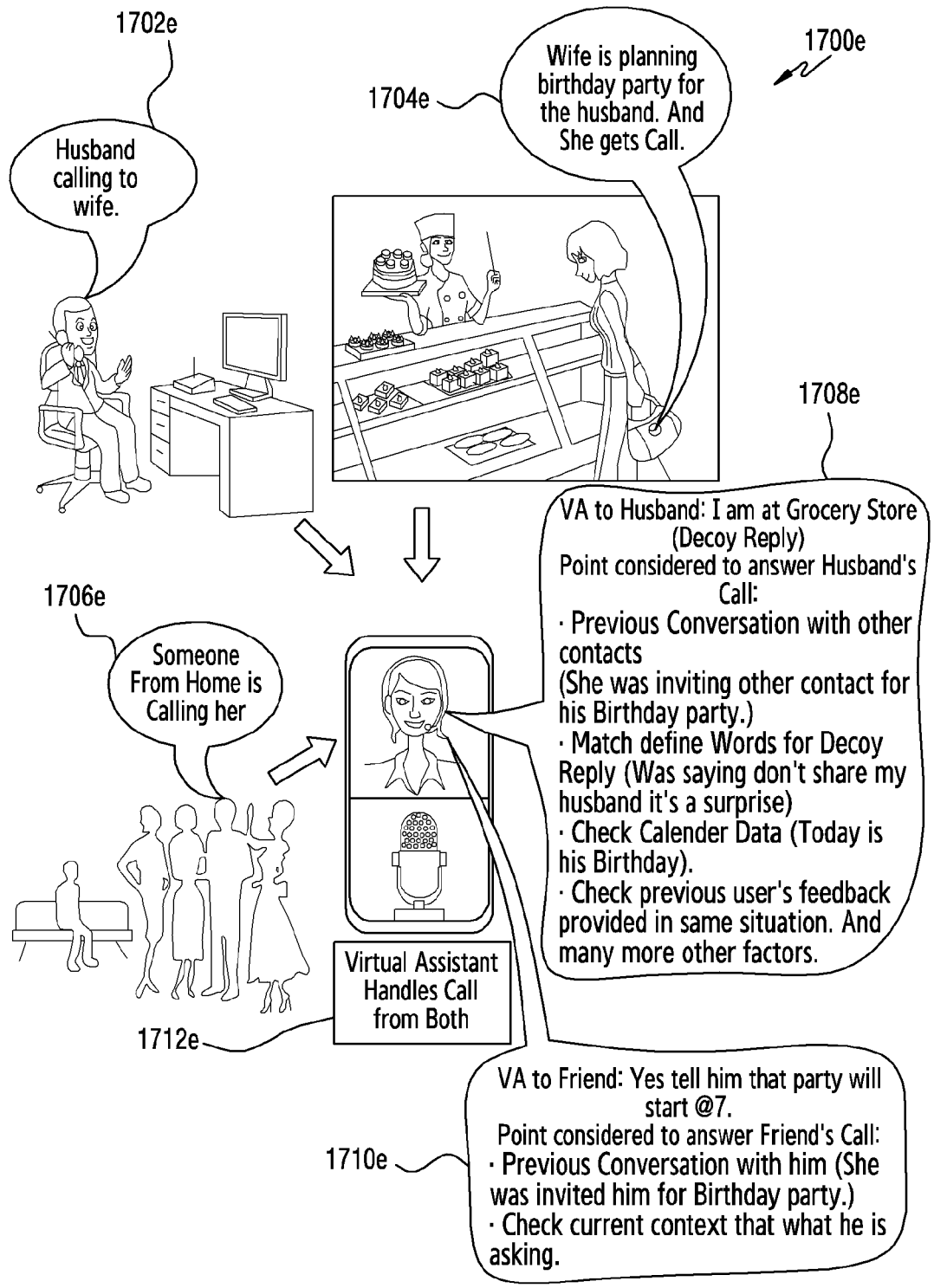
[Fig. 17E]

[Fig. 18]
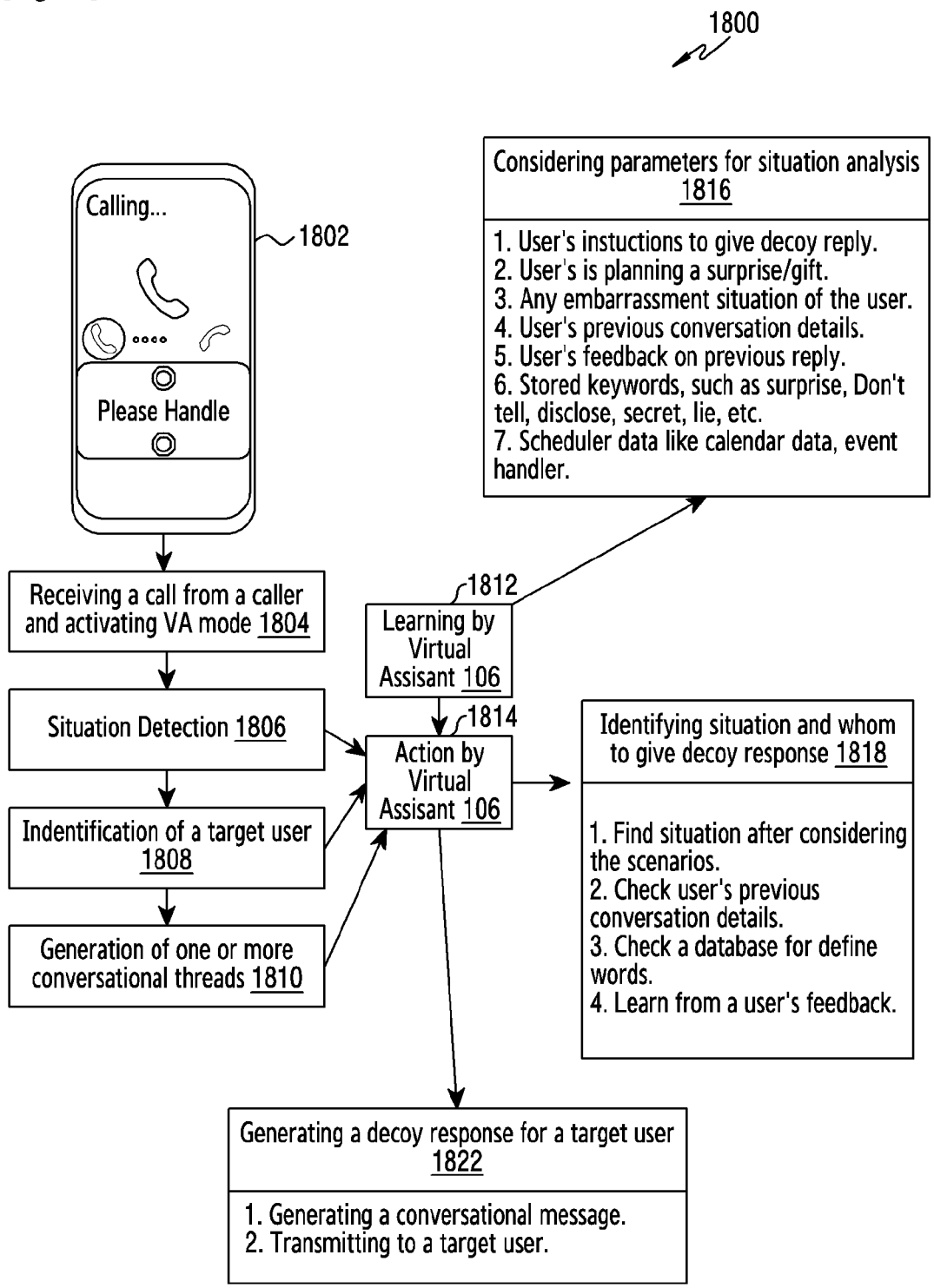

COMMAND BASED INTERACTIVE SYSTEM AND A METHOD THEREOF

TECHNICAL FIELD

The disclosure relates generally to automatically managing calls, and, more particularly, the disclosure relates to automatically managing calls to a system and method for managing command based interactive calls.

BACKGROUND ART

A virtual assistant, also called an artificial intelligence (AI) assistant, or a digital assistant understands natural language commands and complete tasks for users. The virtual assistant uses natural language processing (NLP) techniques to match user text or voice input to executable commands. Today, every smartphones and other electronic devices, in a market, having a smart assistant or a virtual assistant. This provides support services to the users who are using the respective smartphones and/or electronic devices having the virtual assistant. The virtual assistant allows managing daily routine tasks of an associated user, for example, call to a caller, send a message, schedule meetings, play music, answer questions, set reminders, travel bookings, hotel bookings, play movies, monitor health parameters, provide information related to weather forecasts, launch applications and games, and the like. Many virtual assistants are available in the market, such as Bixby®, SIRI®, Cortana®, Google Assistant®, AVIC®, and the like. All these virtual assistants perform task and help the associated user to make their life easy and efficient.

Typically, smartphones users are increasing day by day, and therefore number of phone calls are also increasing worldwide. Call tariff charges are decreasing, especially international call charges, due to which high number of calls are exchanged worldwide. There are many automatic call rejection applications in the market, for example True-Caller®, that automatically reject calls for specific contact numbers or spam contact numbers. Further, users are spending more time on their associated phones, which are impacting their health and work.

For example, a user is busy in some work and someone from his/her home makes a call to him. He tried to disconnect the call by answering the caller in short time but that call takes so much time, due to which user end up gets disturbed. In another example, a user needs to concentrate in a meeting and some important call is coming again and again even after disconnecting many times, or a user is in bad mood and her relative or friends call her without knowing his/her mood. The user received the call and reply very badly, which hurts the caller at that moment.

U.S. Pat. No. 7,515,699 discloses a call handling device that detects an incoming call to a user's phone, allows two-way communication between a user device and a call handling device, and processes the incoming call in response to instructions received by the two-way communication. After detecting the incoming call, the call handling device sends a message to a mobile device carried out by a user using the two-way communication. The user may then input a response to the message using the mobile device and send an instruction to the call handling device for handling the call. In the call handling device, the user needs to pay attention even if he is not attending the calls. The text conversation is involved, which takes more time in comparison to voice conversation.

US20150088514 discloses in-call virtual assistants to assist users during voice communication. For instance, a first user operates a device may establish a voice communication with a device of a second user. The voice communication may be utilized via a public switched telephone network (PSTN), a cellular network, a voice-over-internet-protocol (VoIP) network, and the like. However, in the in-call assistants, a user has to get involved when a virtual assistant is required. Further, the virtual assistant performs tasks like "set schedule among us" on user commands. The virtual assistant only performs tasks, and it is not able to respond other users on call.

US20150045003 discloses auto-activating smart responses based on activities from remote devices. In this, instructions are given prior to the call event and assuming the call might get received and no microphone context based switching is disclosed.

Therefore, there is a need of a command based interactive system and method that limits the aforementioned drawbacks.

DISCLOSURE OF INVENTION

Solution to Problem

This summary is provided to introduce concepts related to managing a command based interactive call. This summary is neither intended to identify essential features of the disclosure nor is it intended for use in determining or limiting the scope of the disclosure.

For example, various embodiments herein may include one or more systems and methods for managing a command based interactive call are provided. In one of the embodiments, the method includes a step of detecting an incoming call from a caller on an electronic device. The method includes a step of detecting, by the electronic device, at least one or a combination of a user input, first context data of the call, and pre-setting information. The method includes a step of enabling the electronic device for receiving a command from a user, wherein the command is not recognized by the caller. Further, the method includes the steps of recording the command to be provided by the user, analyzing the recorded command by detecting at least one or a combination of second context data, the pre-setting information, and a pre-defined category, and Furthermore, the method includes a step of generating one or more conversational threads based on the analyzed command, and transmitting the one or more conversational threads to the caller during a conversation with the caller.

In another embodiment, a command based interactive system is configured to manage a command based interactive call. The system includes an electronic device and an AI engine. The electronic device is associated with a user, which includes a first memory, a first processor, a detection module, a switching module, and a recording module. The first memory is configured to store pre-determined rules. The first processor is configured to generate device processing commands. The detection module is configured to detect an incoming call from a caller and at least one or a combination of a user input, first context data of the call, and pre-setting information. The switching module is configured to enable the electronic device to receive a command from the user, wherein the command is not recognized by the caller. The recording module is configured to record the command to be provided by the user. The AI engine is configured to cooperate with the electronic device. The AI engine includes a second memory, a second processor, a determination module, an analyzer, and a communication module. The second memory is configured to store pre-determined rules. The second processor is configured to generate system processing commands. The analyser is configured to analyse the command by detecting at least one or a combination of second context data, the pre-setting information, and a pre-defined category, and generate one or more conversational threads based on the analyzed command. The communication module is configured to transmit the one or more conversational threads to the caller, during a conversation with the caller.

In another embodiment, an electronic device includes a first memory, a first processor, a detection module, a switching module, and a recording module. The first memory is configured to store pre-determined rules. The first processor is configured to generate device processing commands. The detection module is configured to detect an incoming call from a caller and at least one or a combination of a user input, first context data of the call, and pre-setting information. The switching module is configured to enable the electronic device to receive a command from the user, wherein the command is not recognized by said caller. The recording module is configured to record the command simultaneously to be provided by said user.

In another embodiment, a method for managing a command based interactive call includes a step of detecting an incoming call from a caller on an electronic device. The method includes a step of detecting, by the electronic device, at least one or a combination of a user input, first purpose context data of the call, and pre-setting information. The method includes a step of enabling the electronic device to receive a command from a user, wherein the command is not recognized by the caller. The method includes a step of recording the command to be provided by the user. The method includes a step of analyzing the command and first answer context data. The method includes a step of determining at least one or a combination of second purpose context data from an initial conversation from a caller, and the pre-setting information. The method includes a step of matching the second purpose context data with the first answer context data. The method includes a step of generating one or more conversational threads based on the matched data. The method includes a step of transmitting the one or more conversational threads during the conversation with the caller.

In another embodiment, a command based interactive system for managing a command based interactive call, includes an electronic device and an AI engine. The electronic device is associated with a user. The electronic device includes a first memory, a first processor, a detection module, a switching module, and a recording module. The first memory is configured to store pre-determined rules. The first processor is configured to generate device processing commands. The detection module is configured to detect an incoming call from a caller and at least one or a combination of a user input, first purpose context data of the call, and pre-setting information. The switching module is configured to enable the electronic device to receive a command from the user, wherein the command is not recognized by the caller. The recording module is configured to record the command to be provided by the user. The AI engine is configured to cooperate with the electronic device. The AI engine includes a second memory, a second processor, and a context analysis module. The second memory is configured to store pre-determined rules. The second processor is configured to generate system processing commands. The context analysis module is configured to analyse the command and first answer context data, and determine at least one or a combination of second purpose context data from an initial conversation from a caller, and the pre-setting information. The context analysis module is further configured to match the second purpose context data with the first answer context data, generate one or more conversational threads based on the matched data, and transmit the one or more conversational threads, during the conversation with the caller.

In an embodiment, a method for managing a command based interactive call includes a step of detecting an incoming call from a caller on an electronic device. The method includes a step of detecting, by a virtual assistant, at least one or a combination of a user input, first purpose context data of the call, and pre-setting information. The method includes a step of enabling, by the virtual assistant, the electronic device to receive a voice command from a user, wherein the voice command is not audible to the caller. The method includes a step of recording, by the virtual assistant, the voice command to be provided by the user. The method includes a step of analyzing, by the virtual assistant, the recorded command by detecting at least one or a combination of second context data, the pre-setting information, and a pre-defined category. The method includes a step of generating, by the virtual assistant, one or more conversational threads based on the analysed command. The method includes a step of transmitting, by the virtual assistant, the one or more conversational threads to the caller during a conversation with the caller.

In an embodiment, a command based interactive system for managing a command based interactive call includes a virtual assistant. The virtual assistant is configured to detect an incoming call from a caller and at least one or a combination of a user input, first purpose context data of the call, and pre-setting information. The virtual assistant is configured to enable the electronic device to receive a voice command from the user, wherein the command is not audible to the caller, and record the command to be provided by the user. Further, the virtual assistant is configured to analyse the recorded command by detecting at least one or a combination of second context data, the pre-setting information, and a pre-defined category. The virtual assistant is configured to generate one or more conversational threads based on the analyzed command and transmit the one or more conversational threads to the caller during a conversation with said caller.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and modules.

FIG. 1 illustrates a schematic diagram depicting a command based interactive system for managing a command based interactive call, according to an exemplary implementation of the disclosure.

FIG. 2 illustrates a block diagram depicting the command based interactive system of FIG. 1, according to an exemplary implementation of the disclosure.

FIG. 3 illustrates a schematic diagram depicting components of the command based interactive system of FIG. 1 in a client-server arrangement, according to an exemplary implementation of the disclosure.

FIG. 4 illustrates a schematic diagram depicting an AI engine, according to an exemplary implementation of the disclosure.

FIG. 5 illustrates a schematic diagram depicting an example of switching module of an electronic device of FIG. 2, according to an exemplary implementation of the disclosure.

FIG. 6 illustrates a schematic diagram for call purpose prediction, according to an exemplary implementation of the disclosure.

FIG. 7 illustrates a schematic diagram for instruction extraction, according to an exemplary implementation of the disclosure.

FIG. 8 illustrates a flow diagram for short instruction understanding using previous conversation details, according to an exemplary implementation of the disclosure.

FIG. 9 illustrates a flowchart depicting a method for managing a command based interactive call, according to an exemplary implementation of the disclosure.

FIG. 10 illustrates a flowchart depicting a method for detecting context data from an incoming call, according to an exemplary implementation of the disclosure.

FIG. 11 illustrates a flowchart depicting steps for receiving an incoming call by a virtual assistant, according to an exemplary implementation of the disclosure.

FIG. 12 illustrates a flowchart depicting steps for activating a microphone, according to an exemplary implementation of the disclosure.

FIG. 13 illustrates a flowchart depicting steps for verifying user authentication for answering an incoming call, according to an exemplary implementation of the disclosure.

FIG. 14 illustrates a flowchart depicting steps for receiving an incoming call, according to an exemplary implementation of the disclosure.

FIG. 15 illustrates a flowchart depicting steps for displaying the conversation to a user on run time and key information, according to an exemplary implementation of the disclosure.

FIG. 16 illustrates a flowchart depicting steps for matching purpose context data and answer context data from user's message, according to an exemplary embodiment of the disclosure.

FIGS. 17A-17E illustrate use-case scenarios depicting answering phone calls by a virtual assistant, according to an exemplary implementation of the disclosure.

FIG. 18 illustrates a flow diagram for generation of a decoy response, according to an exemplary implementation of the disclosure.

It should be appreciated by those skilled in the art that any block diagrams herein represent conceptual views of illustrative systems embodying the principles of the disclosure. Similarly, it will be appreciated that any flowcharts, flow diagrams, and the like represent various processes which may be substantially represented in computer readable medium and so executed by a computer or processor, whether or not such computer or processor is explicitly shown.

BEST MODE FOR CARRYING OUT THE INVENTION

In the following description, for the purpose of explanation, specific details are set forth in order to provide an understanding of the disclosure. It will be apparent, however, to one skilled in the art that the disclosure may be practiced without these details. One skilled in the art will recognize that embodiments of the disclosure, some of which are described below, may be incorporated into a number of systems.

The various embodiments of the disclosure provide a command based interactive system and a method thereof.

Furthermore, connections between components and/or modules within the figures are not intended to be limited to direct connections. Rather, these components and modules may be modified, re-formatted or otherwise changed by intermediary components and modules.

References in the disclosure to "one embodiment" or "an embodiment" mean that a particular feature, structure, characteristic, or function described in connection with the embodiment is included in at least one embodiment of the invention. The appearances of the phrase "in one embodiment" in various places in the specification are not necessarily all referring to the same embodiment.

In one of the embodiments, the method includes a step of detecting an incoming call from a caller on an electronic device. The method includes a step of detecting, by the electronic device, at least one or a combination of a user input, first context data of the call, and pre-setting information. The method includes a step of enabling the electronic device for receiving a command from a user, wherein the command is not recognized by the caller. Further, the method includes the steps of recording the command to be provided by the user, analyzing the recorded command by detecting at least one or a combination of second context data, the pre-setting information, and a pre-defined category. Furthermore, the method includes a step of generating one or more conversational threads based on the analysed command, and transmitting the one or more conversational threads to the caller during a conversation with the caller.

In another implementation, the method includes storing, in a database, information related to the user, a plurality of callers associated with the user, pre-defined categories for each caller, and pre-setting information.

In another implementation, the command includes a voice command or a text command.

In another implementation, the first context data and second context data include purpose of a call, usage data, current activities of a user, pre-stored user schedule, sensor data, time of a call, location of a call, relationship with the caller, a category of the caller, previous calling history and conversation details, voice tone, speed of talking, and frequency of a call between a user and a caller.

In another implementation, the step of transmitting includes transmitting one or more portion of each of the conversational threads to the caller during a conversation with the caller.

In another implementation, the method includes picking, by a virtual assistant, the incoming call in conversation with the caller, and generating, by the virtual assistant, one or more conversational threads.

In another implementation, the method includes handling, by the virtual assistant, the call received from the caller based on a voice message, provided by the user.

In another implementation, the method includes a step of processing, by the virtual assistant, the steps after detecting the incoming call from the caller. The steps include detecting the at least one or a combination of the user input, the first context data, and the pre-setting information; enabling the electronic device for receiving a command from a user; recording the command to be provided by the user; analyzing the recorded command by detecting at least one or a combination of second context data, the pre-setting information, and a pre-defined category; generating one or more conversational threads based on the analysed command, and transmitting the one or more conversational threads to the caller during conversation of the caller.

In another implementation, the user input is in the form of text, voice, or gesture, said gesture includes touch gesture, shake gesture, face expression gesture, hand gesture, and body gesture.

In another implementation, the method includes authenticating the user by using authentication techniques. The authentication techniques include a voice recognition technique, a pattern recognition technique, a password, a fingerprint recognition technique, or a face recognition technique.

In another implementation, the step of recording the command includes detecting a specific spoken word or a group of words from the command.

In another implementation, the step of determining the second context data based on call purpose prediction, at least one of device movement information of the electronic device, busyness of the user, time of call, caller details, pre-stored user schedule, previous conversational details, location information, frequency of the call, usage data, current activities of a user, sensor data, real time conversation or current conversation, and historical call details.

In another implementation, the step of receiving, by the electronic device, the command from the user at a threshold time.

In another implementation, enabling the electronic device includes putting the call in virtual assistant mode after the threshold time.

In another implementation, the method includes disabling the recording of the command by detecting threshold time silence during the received command.

In another implementation, generating the one or more conversational threads is based on real time conversation or current conversation, relationship of the user with the caller, a category of the caller, previous history, pre-determined hard coded settings, caller details, pre-determined user's speaking style, pre-determined tone and pitch settings.

In another implementation, the method includes creating a conversational user interface, and displaying the conversation in a form of text message.

In another implementation, displaying, by the user interface, at least one icon for listening the conversational threads.

In another implementation, transmitting, by the virtual assistant, the conversational threads in the form of audio or text, to the caller if the received call is disconnected before picking up the call by the user.

In another implementation, the method includes processing and detecting the voice command provided by the user, and filtering noise from the command.

In another implementation, the voice authentication technique includes at least one voice data.

In another implementation, the method includes extracting instructions provided by the user from noise, and providing the instructions to the virtual assistant for generating the conversational threads.

In another implementation, generating the one or more conversational threads based on pre-defined information including a ringtone, a message tone, a sentence structure, vocabulary, speed of delivery based on a category of the caller, response of the caller, voice tone of the user, purpose of the call, context data, language of the caller, and previous conversational details.

In another implementation, the step of generating one or more conversational threads is based on the command and information associated with the user.

In another implementation, the method includes providing restricted information is based on at least one or a combination of the pre-setting information, user's instructions, user's information, caller's information, sensor information, the pre-setting information, or context related information, wherein the user's information include location information, calendar data, and other user related information.

In another implementation, the method includes a step of providing restricted information is based on decoy information or a decoy response.

In another implementation, the method includes generating, by the virtual assistant, a decoy response based on pre-determined conditions, and providing, by the virtual assistant, the decoy response to the caller.

In another embodiment, a command based interactive system is configured to manage a command based interactive call. The system includes an electronic device and an AI engine. The electronic device is associated with a user, which includes a first memory, a first processor, a detection module, a switching module, and a recording module. The first memory is configured to store pre-determined rules. The first processor is configured to generate device processing commands. The detection module is configured to detect an incoming call from a caller and at least one or a combination of a user input, first context data of the call, and pre-setting information. The switching module is configured to enable the electronic device to receive a command from the user, wherein the command is not recognized by the caller. The recording module is configured to record the command to be provided by the user. The AI engine is configured to cooperate with the electronic device. The AI engine includes a second memory, a second processor, a determination module, an analyzer, and a communication module. The second memory is configured to store pre-determined rules. The second processor is configured to generate system processing commands. The analyser is configured to analyse the command by detecting at least one or a combination of second context data, the pre-setting information, and a pre-defined category, and generate one or more conversational threads based on the analysed command. The communication module is configured to transmit the one or more conversational threads to the caller, during a conversation with the caller.

In another implementation, the AI engine includes a database configured to store information related to the user, a plurality of callers associated with the user, pre-defined categories for each caller, context related data, and pre-setting information.

In another implementation, the recording module comprises microphone.

In another implementation, the system includes a virtual assistant configured to pick the incoming call in conversation with the caller, and generate one or more conversational threads.

In another implementation, the virtual assistant further configured to handle call received from the caller based on a voice message provided by the user.

In another implementation, the AI engine comprises an authentication module configured to authenticate the user by using authentication techniques, the authentication techniques include a voice recognition technique, a pattern recognition technique, a password, a fingerprint recognition technique, or a face recognition technique.

In another implementation, the electronic device comprises a low power audio detection module configured to detect a specific spoken word or a group of words, from the command.

In another implementation, the determination module is configured to determine the second context data based on call purpose prediction, at least one of device movement information of the electronic device, busyness of the user, time of call, caller details, pre-stored user schedule, previous conversational details, location information, frequency of the call, purpose of a call, usage data, current activities of a user, sensor data, and historical call details.

In another implementation, the electronic device includes a sensing module configured to sense the movements of the electronic device. The sensing module includes a plurality of sensors, including accelerometer, Global Positioning System (GPS) sensors, data sensors, and low energy sensors.

In another implementation, the electronic device includes a mobile device, a smart watch, a tablet, an augmented reality glasses, and a wrist watch.

In another implementation, the switching module is configured to disable recording of the command by detecting threshold time silence during the received command from the recording module of the electronic device.

In another implementation, the analyser is configured to generate the one or more conversational threads based on real-time conversation or current conversation, relationship of the user with the caller, a category of the caller, previous history, pre-determined hard coded settings, caller details, pre-determined user's speaking style, pre-determined tone and pitch settings.

In another implementation, the AI engine includes a conversational display creator configured to create a conversational user interface, and display the one or more conversational threads in a form of text message or voice message.

In another implementation, the conversational display creator is configured to generate a textual command.

In another implementation, the virtual assistant is configured to generate the one or more conversational threads based on pre-defined information including a ringtone, a message tone, a sentence structure, vocabulary, speed of delivery based on a category of the caller, response of the caller, voice tone of the caller, purpose of the call, context data, language of the caller, and previous conversational details.

In another embodiment, an electronic device includes a first memory, a first processor, a detection module, a switching module, and a recording module. The first memory is configured to store pre-determined rules. The first processor is configured to generate device processing commands. The detection module is configured to detect an incoming call from a caller and at least one or a combination of a user input, first context data of the call, and pre-setting information. The switching module is configured to enable the electronic device to receive a command from the user, wherein the command is not recognized by said caller. The recording module is configured to record the command simultaneously to be provided by the user.

In another implementation, the recording module includes a microphone and a speaker.

In another implementation, the electronic device is configured to communicatively coupled with an AI engine, in a client server arrangement. The AI engine is present at a server.

In another embodiment, a method for managing a command based interactive call includes a step of detecting an incoming call from a caller on an electronic device. The method includes a step of detecting, by the electronic device, at least one or a combination of a user input, first purpose context data of the call, and pre-setting information. The method includes a step of enabling the electronic device to receive a command from a user, wherein the command is not recognized by the caller. The method includes a step of recording the command to be provided by the user. The method includes a step of analyzing the command and first answer context data. The method includes a step of determining at least one or a combination of second purpose context data from an initial conversation from a caller, and the pre-setting information. The method includes a step of matching the second purpose context data with the first answer context data. The method includes a step of generating one or more conversational threads based on the matched data. The method includes a step of transmitting the one or more conversational threads during the conversation with the caller.

In another implementation, if the purpose context data and the first answer context data is not matched, transmitting a second conversational threads with the second answer context data to the caller.

In another implementation, the method includes identifying intent of the caller, a category of the caller, sentiments of the caller, commands provided by the user, and previous conversation of the user with the caller.

In another embodiment, a command based interactive system for managing a command based interactive call, includes an electronic device and an AI engine. The electronic device is associated with a user. The electronic device includes a first memory, a first processor, a detection module, a switching module, and a recording module. The first memory is configured to store pre-determined rules. The first processor is configured to generate device processing commands. The detection module is configured to detect an incoming call from a caller and at least one or a combination of a user input, first purpose context data of the call, and pre-setting information. The switching module is configured to enable the electronic device to receive a command from the user, wherein the command is not recognized by the caller. The recording module is configured to record the command to be provided by the user. The AI engine is configured to cooperate with the electronic device. The AI engine includes a second memory, a second processor, and a context analysis module. The second memory is configured to store pre-determined rules. The second processor is configured to generate system processing commands. The context analysis module is configured to analyse the command and first answer context data, and determine at least one or a combination of second purpose context data from an initial conversation from a caller, and the pre-setting information. The context analysis module is further configured to match the second purpose context data with the first answer context data, generate one or more conversational threads based on the matched data, and transmit the one or more conversational threads, during the conversation with the caller.

In another implementation, if the purpose context data and the first answer context data is not matched, transmit a second conversational threads with the second answer context to the caller.

In another implementation, the electronic device includes a display unit configured to display the conversational threads.

In another implementation, the virtual assistant comprises a dialog manager configured to identify intent of the caller, a category of the caller, sentiments of the caller, commands provided by the user, and previous conversation of the user with the caller, and generate dialogs.

In another implementation, the dialog manager is configured to identify the intent of the caller by parsing the conversational threads from the received call.

In an embodiment, a method for managing a command based interactive call includes a step of detecting an incoming call from a caller on an electronic device. The method includes a step of detecting, by a virtual assistant, at least one or a combination of a user input, first purpose context data of the call, and pre-setting information. The method includes a step of enabling, by the virtual assistant, the electronic device to receive a voice command from a user, wherein the voice command is not audible to the caller. The method includes a step of recording, by the virtual assistant, the voice command to be provided by the user. The method includes a step of analyzing, by the virtual assistant, the recorded command by detecting at least one or a combination of second context data, the pre-setting information, and a pre-defined category. The method includes a step of determining, by the virtual assistant, at least one or a combination of the second context data of the call, and the pre-setting information. The method includes a step of generating, by the virtual assistant, one or more conversational threads based on the determined at least one or a combination of the second context data of the call, and the pre-setting information. The method includes a step of transmitting, by the virtual assistant, the one or more conversational threads to the caller during a conversation with the caller.

In an embodiment, the step of transmitting includes transmitting one or more portion of each of the conversational threads to the caller during a conversation with the caller.

In an embodiment, a command based interactive system for managing a command based interactive call includes a virtual assistant. The virtual assistant is configured to detect an incoming call from a caller and at least one or a combination of a user input, first purpose context data of the call, and pre-setting information. The virtual assistant is configured to enable the electronic device to receive a voice command from the user, wherein the command is not audible to the caller, and record the command to be provided by the user. Further, the virtual assistant is configured to analyse the recorded command by detecting at least one or a combination of second context data, the pre-setting information, and a pre-defined category, and determine at least one or a combination of the second context data of the call, and the pre-setting information. The virtual assistant is configured to generate one or more conversational threads based on the determined at least one or a combination of the second context data of the call, and the pre-setting information, and transmit the one or more conversational threads to the caller during a conversation with said caller.

FIG. 1 illustrates a schematic diagram depicting a command based interactive system (100) for managing a command based interactive call, according to an exemplary implementation of the disclosure.

The command based interactive system (100) (hereinafter referred as "system" includes an electronic device (102), a network (104), a virtual assistant (106), and an AI engine (108). The electronic device (102) is associated with a user (A). The electronic device (102) can be, but is not limited to, a personal computer (102a), a laptop (102b), a tablet (102c), a smartphone/phone (102d), a wrist watch/smart watch (102e), or an augmented reality device (102f). In an embodiment, the system (100) includes a plurality of electronic devices (102a, 102b, 102c, 102d, 102e, 102f) associated with multiple users. The electronic device (102) is communicatively coupled with the AI engine (108) via a network (104). In one embodiment, the network (106) includes wired and wireless networks. Examples of the wired networks include a Wide Area Network (WAN) or a Local Area Network (LAN), a client-server network, a peer-to-peer network, and so forth. Examples of the wireless networks include Wi-Fi, a Global System for Mobile communications (GSM) network, and a General Packet Radio Service (GPRS) network, an enhanced data GSM environment (EDGE) network, 802.5 communication networks, Code Division Multiple Access (CDMA) networks, or Bluetooth networks.

The virtual assistant (106) is configured to cooperate with the electronic device (102), and the AI engine (108) to access the electronic device (102), and the AI engine (108) simultaneously, and assisting the user (A) in answering the calls received from a caller. In an embodiment, the virtual assistant (106) is configured to enable answering the phone calls received from the caller automatically, which makes the user's (A) life easy. In an embodiment, the system (100) is configured to perform functionalities either using the electronic device (102) or by the virtual assistant (106). The system (100) automatically manages the incoming/outgoing call of the electronic device (102) associated with the user. The virtual assistant (106) automatically answers the calls to make the user's life easy and provide efficient usage of time while answering the call, which saves user's time and effort in answering the calls. The system (100) automatically manages the calls by using the virtual assistant (106) and artificial intelligence techniques based on user inputs and preferences. In an embodiment, the user doesn't need to give any response to the incoming call. The user can reject the call and does a message to the caller. The user can pick the call and doesn't give proper answer, which is needed for the caller. The user can divert the incoming call on some other number.

FIG. 2 illustrates a block diagram (200) depicting the command based interactive system (100) of FIG. 1, according to an exemplary implementation of the disclosure.

The electronic device (102) comprises a first memory (202), a first processor (204), a detection module (206), a switching module (208), and a recording module (210).

The first memory (202) is configured to store pre-determined rules related to input/output peripherals of the electronic device (100). The input peripherals include a transceiver, a microphone, a speaker, a user interface, user inputs, and a plurality of sensors. The output peripheral includes a mike and a display unit which display notification to the user. In an embodiment, the first memory (202) can include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. The first memory (202) also includes a cache memory to work with the electronic device (102) more effectively.

The first processor (204) is configured to cooperate with the first memory (204) to receive the pre-determined rules. The first processor (204) is further configured to generate device processing commands. In an embodiment, the first processor (204) may be implemented as one or more microprocessors, microcomputers, microcontrollers, digital signal processors, central processing units, state machines, logic circuitries, and/or any devices that manipulate signals based on operational instructions. Among other capabilities, the at least one first processor (204) is configured to fetch the pre-determined rules from the first memory (204) and execute different modules of the electronic device (102).

The detection module (206) is configured to detect an incoming call from a caller and at least one or a combination of a user input, first context data of the call, and pre-setting information. In an embodiment, the first context data includes purpose of the call, usage data, current activities of a user, pre-stored user schedule, sensor data, time of a call, location of a call, real time conversation and current conversation, previous history call details, relationship with caller, and frequency of a call between a user and a caller. In another embodiment, the user input is in the form of text, voice, or gesture.

The gesture includes touch gesture, shake gesture, face expression gesture, hand gesture, and body gesture.

The sensing module (214) is configured to sense the movements of the electronic device (102) associated with the user. The sensing module (214) comprises a plurality of sensors including an accelerometer, Global Positioning System (GPS) sensors, data sensors, and low energy sensors. In an embodiment, the low energy sensors include Bluetooth low energy sensors. The Bluetooth low energy sensors signals can be used to determine a number of users/known users in vicinity to put the microphone in a virtual assistant mode, and not put the call on normal functionality. In an embodiment, the sensing module (214) is configured to sense a motion and actions of the user.

In an embodiment, the sensing module (214) is configured to sense information includes relevant information of the user to understand if the user is free to attend the call, and accordingly the switching module (208) enables/activates the microphone to take a command/voice command from the user. In one embodiment, the relevant information includes, sensing data, location data, calendar data, and the like. In an exemplary embodiment, the sensing module (214) detects that the user is moving by analyzing the readings of an accelerometer, and GPS sensors. The switching module (208) then automatically switch ON the microphone to take the voice command from the user instead of directly transferring the call to the user. In an embodiment, the detection module (206) is configured to detect the sensor data, which is first context data.

In an embodiment, the detection module (206) is configured to receive a call of a caller, and further configured to generate a notification of the incoming call to the user. In another embodiment, the detection module (206) is configured to detect the details of the caller, and pre-settings set by the user for the caller.

In an embodiment, the detection module (206) is configured to initiate a call with a caller in case of disconnection. For example, if the caller disconnects the call, when the user is giving the instruction or information, then the electronic device (102) calls to the caller again after taking full instructions from the user. In an embodiment, the if the caller disconnects the call, when the user is giving the instruction or information, then the virtual assistant (106) as shown in FIG. 1, calls to the caller again after taking full instructions from the user.

The switching module (208) is configured to enable the electronic device (102) to receive a command from the user. In an embodiment, the command is not recognized by the caller. The switching module (208) is configured to receive the command from the user at a threshold time, and put the call in a virtual assistant mode after the threshold time. The command includes a voice command or a text command. In another embodiment, the switching module (208) is configured to enable a microphone of the electronic device (102), to receive the voice command from the user. In an embodiment, the switching module (208) is configured to enable the microphone to record the voice command provided by the user, if the electronic device (102) detects an incoming call. In yet another embodiment, the switching module (208) is configured to enable an input module (not shown in figure) to receive a text command from the user. In one embodiment, the switching module (208) is configured to disable recording of the command by detecting threshold time silence during the received command from the recording module (210) of the electronic device (102).

In an embodiment, the switching module (208) is configured to facilitate a feature of call attending, by the virtual assistant (106), at the time of initial conversation of the user with the caller, or at the same time when the user gives the command or a short message/instruction. In another embodiment, in a case, when the user gives a command/instruction to switch/transfer the call from the virtual assistant (106) to the user, then the switching module (208) is configured to automatically switch the call of the caller from the virtual assistant (106) to the user.

In an exemplary embodiment, if the user gives a command/instruction to pick up the call, then the electronic device (102) performs normal call functioning, and the user may be notified that a recorded voice command being shared with the caller.

In an embodiment, the system (100) further configured to process and detect the voice command provided by the user, and filter noise from the voice command.

The recording module (210) is configured to record the command to be provided by the user. In an embodiment, the recording module (210) includes a microphone.

The electronic device (102) further includes a low power detection module (212), a sensing module (214), and a display unit (216).

The low power detection module (212) is configured to detect a specific spoken word, or a group of words from the command. In an embodiment, the low power detection module (212) is configured to detect the specific spoken word, or the group of words in a case of switching ON the microphone. In another embodiment, the recording command includes detected word or the group of words, spoken by the user.

The display unit (216) is configured to display conversational threads between the virtual assistant (106) and the caller, and/or between the user and the caller.

The AI engine (108) is configured to cooperate with the electronic device (102). The AI engine (108) includes a second memory (218), a second processor (220), an analyser (222), and a communication module (226).

The second memory (218) is configured to store pre-determined rules related to analyzing, determining, extracting, and authenticating data. In an embodiment, the second memory (218) can include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. The second memory (218) also includes a cache memory to work with the electronic device (102) more effectively.

The second processor (220) is configured to cooperate with the second memory (218) to receive the pre-determined rules. The second processor (220) is further configured to generate device processing commands. In an embodiment, the second processor (220) may be implemented as one or more microprocessors, microcomputers, microcontrollers, digital signal processors, central processing units, state machines, logic circuitries, and/or any devices that manipulate signals based on operational instructions. Among other capabilities, the at least one second processor (220) is configured to fetch the pre-determined rules from the second processor (220) and execute different modules of the system (100).

The analyser (222) is configured to analyse the command by detecting at least one or a combination of second context data, the pre-setting information, and a pre-defined category, and generates one or more conversational threads based on the analysed command. In an embodiment, the analyser (224) is configured to generate the one or more conversational threads based on real time conversation or current conversation, relationship of the user with the caller, a category of the caller, previous history, pre-determined hard coded settings, the caller details, pre-determined user's speaking style, pre-determined tone and pitch settings.

In an embodiment, the AI engine (108) includes a database (234). The database (234) is configured to store information related to the user, a plurality of callers associated with the user, pre-defined categories for each caller, context related data, and pre-setting information. In an embodiment, the pre-setting information includes classification/confidential level of data. In an exemplary embodiment, a first confidential level of data includes most confidential data, for example, a family member. The second confidential level of data includes intermediate confidential data, for example, friends, colleagues, business partners, etc. The third confidential level of data includes low confidential data, for example, unknown caller.

In one embodiment, the database (234) is configured to store analytics data, voice signature for voice authorization, and passwords. In an embodiment, the database (234) includes a look up table configured to store information. In one embodiment, the database (234) can be implemented as enterprise database, remote database, local database, and the like. The database (234) can be located within the vicinity of the AI engine (108) or can be located at different geographic locations as compared to that of the AI engine (108). Further, the database (234) may themselves be located either within the vicinity of each other or may be located at different geographic locations. Furthermore, the database (234) may be implemented inside the AI engine (108) and the database (234) may be implemented as a single database.

The communication module (226) is configured to cooperate with the analyser (222) to receive the one or more conversational threads, and the transmit the conversational threads to the caller. In an embodiment, the communication module (226) is configured to transmit one or more portion of each of the conversational threads to the caller during a conversation with the caller. In an embodiment, the one or more conversational threads can be generated on run time as well during conversation with the caller. The conversational threads include a plurality of parameters and information set for the conversation. In another embodiment, the communication module (226) is configured perform communication between the user and the caller. In another embodiment, the one or more conversational threads are processed by the virtual assistant (106) during conversation with the caller on run time.

In an embodiment, the AI engine (108) includes a determination module (224). The determination module (224) is configured to determine at least one or combination of the second context data of the incoming call and a pre-setting information. In an embodiment, the determination module (224) is configured to determine the second context data based on call purpose prediction, at least one device movement information of the electronic device (102), busyness of the user, time of a call, caller details, pre-stored user schedule, previous conversational details, location information, frequency of the call, purpose of a call, usage data, current activities of a user, sensor data, and historical call details.

In one embodiment, the AI engine (108) includes a conversational display creator (230). The conversational display creator (230) is configured to create a conversational user interface, and display the one or more conversational threads in a form of text message. In another embodiment, the conversational display creator (230) is configured to take a textual command from the user. In an embodiment, the user can reply in between the conversation. In one embodiment, an ongoing conversation can be displayed on the conversational display creator (230).

In an embodiment, one or more conversational threads are generated before actual conversation in the backend of the system (100). The actual conversation can use different generated conversational threads before the actual conversation. The term "conversation" is a well-known term in a field of Artificial Intelligence technology. Specifically, the virtual assistant (VA) (106) generates a conversational, computer-generated characters that simulates a conversation to deliver voice or text information to the caller. The virtual assistant (VA) (106) incorporates natural-language processing, dialogue control, domain knowledge and a visual appearance such as photos or animation, that changes based on the context of the dialogue. In an embodiment, the conversational threads are generated based on the analysis of user's command by detecting a second context data, pre-setting information, a pre-defined category of the caller.

The system (100) further includes a virtual assistant (106). The virtual assistant (106) is configured to pick the incoming call in conversation with the caller, and generate one or more conversational threads. The conversational threads are generated based on the command, voice message understanding, pre-defined information including a ringtone, a message tone, a sentence structure, vocabulary, speed of delivery based on a category of the caller, response of the caller, voice tone of the user, purpose of the call, context data, language of the caller, and previous conversational details. In an embodiment, the user may recognize the conversational threads between the virtual assistant (106) and the caller, simultaneously.

In an exemplary embodiment, the one or more conversational threads are generated based a voice tone of the user, in a following way:

Step 1: A user gets a call.

Step 2: The user provides a voice message in bad tone due to busy schedule.

Step 3: The virtual assistant (106) receives the call, and extracts emotion from user's reply and form a proper reply and then talk with the caller.

Step 4: Record and set reminder for a caller message and show it on a display unit (216).

For example:

1. A user is busy in office and he got a call from his mother.

2. Microphone gets on automatically and the user provides input "User: You know I am busy but still calling why?"

3. VA receives the call and extract emotions and do conversation with Caller.

"VA: Hi Mamma, How are you?

Mummy: I am fine, what about you?

VA: I am also fine too; yes, tell me what is the concern for calling?

Mummy: Nothing important, just call you to know about your health.

VA: Mamma, I am busy right now. If nothing is important then can we talk in evening?

Mummy: Yes, my child, No problem. I will wait for your call in evening. Bye

VA: Okay Bye mamma Take Care"

4. VA converts this information in text, sets a reminder to call the mother in evening and show that on user home screen.

Another Examples

A user is in meeting, and his wife calls. The virtual assistant (106) do conversation with his wife for getting complete information, as shown in (1602f). For example:

User: 5 pm.

Wife: When you reach home.

VA: I am in meeting. I will reach home till 5 pm.

Wife: Okay, I will be late. Please give medicine to Mamma.

VA: Okay Sure. What is the name of Medicine?

Wife: Thank, I will message you in detail.

VA: Okay TC.

A user is busy in urgent work and his mother calls. The virtual assistant (106) automatically, extracts emotions and form a reply on behalf of the user, and talk normally with the mother as the user talks generally. For example, 1. A user is busy in office and he got a call from his mother.

2. Microphone gets on automatically and the user provides input "User: You know I am busy but still calling why?"

3. VA receives the call and extract emotions and do conversation with Caller.

In an exemplary embodiment, a user gives a voice message through voice or text during the ongoing call:

Step 1: A user gets a call.

Step 2: The user provides a voice message on VA mode.

Step 3: The virtual assistant (106) shows conversation in text format to the user in real time, when call is ongoing.

Step 4: User can see the conversation and give message through voice or text during the ongoing call.

For example:

1. A user gets a call from his colleague Racks.

2. User provides a voice message on VA mode.

3. User: Yes, tell me . . . .

4. VA: Hi buddy, I am in meeting. Tell me what is the concern?

5. Racks: Hey, we have a party @ 7 pm. Please reach on time.

6. VA: Okay . . . I will try to reach on time. I can be late because I am having a meeting @ 6.15 pm.

7. User: Yes, I will try to reach on time (Here, the user provides reply in between the conversation.)

Racks: Okay

More specifically, the virtual assistant (106) facilitates a responsive user interface for the electronic device (102). The virtual assistant (106) takes input from the AI engine (108) and represent the information on the display unit (216) of the electronic device (102).

In an embodiment, the AI engine (108) includes an authentication module (228). The authentication module (228) is configured to authenticate the user by using authentication techniques. The authentication techniques include a voice recognition technique, a pattern recognition technique, a password, a fingerprint recognition technique, or a face recognition technique. After authentication, the command provided by the user is fed to the AI engine (108).

The context analysis module (232) then understands the intent of the caller by parsing the conversational threads from the received call.

In an embodiment, the virtual assistant (106) is configured to handle the call received from the caller based on a voice message provided by the user. In another embodiment, the virtual assistant (106) is configured to generate a decoy response based on pre-determined conditions, and provide the decoy response to the caller In an embodiment, the virtual assistant (106) is configured to the process the steps after detecting the incoming call from the caller. The steps include detecting the at least one or a combination of the user input, the first context data, and the pre-setting information, enabling the electronic device (102) for receiving the command from the user, recording the command provided by the user, analyzing the recorded command by detecting at least one or a combination of second context data, the pre-setting information, and the pre-defined category, determining the at least one or a combination of the second context data of the call, and the pre-setting information, generating the one or more conversational threads based on the determined at least one or a combination of the second context data of the call, and the pre-setting information, and transmitting the one or more conversational threads to the caller during conversation of the caller.

The system (100) detects at least one or a combination of a user input, first purpose context data of the incoming call, and pre-setting information. The first purpose context data includes purpose of a call, usage data, current activities of a user, pre-stored user schedule, sensor data, time of a call, location of a call, and frequency of a call between a user and a caller. In an embodiment, the first purpose context data includes relationship with the caller, category of the caller, previous calling history and conversation, user voice tone, speed of talking etc.

The AI engine (108) includes a context analysis module (232) configured to analyse a command provided by the user and first answer context data, and determine at least one or a combination of second purpose context data from an initial conversation with a caller, and the pre-setting information. Subsequently, the context analysis module (232) is configured to match the second purpose context data with the first answer context data. The second purpose context data includes call purpose prediction, at least one device movement information of the electronic device (102), busyness of the user, time of a call, caller details, pre-stored user schedule, previous conversational details, location information, frequency of the call, purpose of a call, usage data, current activities of a user, sensor data, and historical call details.

The context analysis module (232) then generates one or more conversational threads based on the matched data, and transmit the one or more conversational threads, during the conversation with the caller. In an embodiment, if the purpose context data and the first answer context data is not matched, the context analysis module (232) is configured to transmit second conversational threads with second answer context data to the caller.

In an embodiment, the virtual assistant (106) includes a dialog manager (236). The dialog manager (236) is configured to identify intent of the caller, a category of the caller, sentiments of the caller, commands provided by the user, and previous conversational details of the user with the caller, and generate dialogs. In an embodiment, the dialog manager (236) is configured to identify the intent of the caller by parsing the conversational threads from the received call.

In an exemplary embodiment, when the user gets an incoming call from a caller, then the detection module (206) is configured to detect the incoming call, and at least one of the user input, first context data, or pre-setting information. The switching module (208) may be configured to switch ON the microphone with a beep sound for a pre-defined time interval. At the same time, the phone ringtone may go on mute state. The user (A) then provides a voice instruction or information (i.e. a command) to a virtual assistant (106), which is not recognized by the caller. The voice instruction or information may be a short information/instruction. In an embodiment, the voice instruction or information may be provided by the user (A), by assuming a reason why the caller might have called. The voice instruction or information is then analysed by an analyser (222), by detecting at least one or a combination of second context data, the pre-setting information, and a pre-defined category. In an embodiment, the virtual assistant (106) detects second purpose context data from the initial conversation with the caller and detects first answer context data from the command provided by the user. The virtual assistant (106) then determines the at least one or a combination of the second context data of the call, and the pre-setting information, and generates and transmits the one or more conversational threads to the caller, during a conversation with the caller. If both are matched, then the virtual assistant (106) transmits the conversational threads to the caller with the first answer context data. If both are not matched, then a second conversational message with a second answer context data is transmitted to the caller. In another exemplary embodiment, the user can reply to the caller in a virtual assistant mode during ongoing call, at any time in text or voice form. The user can also check the conversation from a log section of the electronic device (102). The conversation is stored in the database (234), in a form of text or audio with a caller name or caller's details.

In an embodiment, the virtual assistant (106) is configured to detect an incoming call from a caller and at least one or a combination of a user input, first purpose context data of the call, and pre-setting information. Further, the virtual assistant (106) is configured to enable the electronic device (102) to receive a voice command from the user, wherein the voice command is not audible to the caller. The virtual assistant (106) is configured to record the command to be provided by the user, and analyse the recorded command by detecting at least one or combination of second context data, the pre-setting information, and a pre-defined category. Further, the virtual assistant (106) is configured to determine at least one or a combination of the second context data of the call, and the pre-setting information, and generate one or more conversational threads, and then transmits the one or more conversational threads to the caller during a conversation with the caller.

Table 1, Table 2, and table 3 represent the user input, first context data, and/or pre-setting information. By using this information, the virtual assistant (106) generates one or more conversational threads.

TABLE 1

| User Input | Result |
|---|---|
| Voice message | Processed by the virtual assistant for a caller |
| Text message | Processed by the virtual assistant for a caller |

TABLE 2

| Pre-setting data | |
|---|---|
| Authentication | Voice, Gesture, Pattern, Text, etc. |
| Microphone states | 1. ON for pre-defined time, |
| | 2. ON only at response time, |
| | 3. ON during the complete call, etc. |
| Sharing | 1. Selected contact |
| Information | 2. All contacts |
| | 3. Selected type for selected users |

TABLE 3

| Context data | |
|---|---|
| Sensors data | 1. Driving |
| | 2. Health information |
| | 3. Emergency information |
| | 4. Setting in group |
| | 5. location information, etc. |
| Sentimental data | 1. Emotions information like anger, happy, romantic, etc. |
| | 2. User behavior information, etc. |
| Calendar data | 1. Schedules |
| | 2. Events, etc. |
| User data | 1. Previous history of calls |
| | 2. User profile, etc. |

FIG. 3 illustrates a schematic diagram depicting components of the command based interactive system of FIG. 1 in a client-server arrangement (300), according to an exemplary implementation of the disclosure. The electronic device (102) is configured to communicatively coupled with an AI engine (108) via a network (104), in a client-server arrangement (300). In an embodiment, the electronic device (102) is located at a client (302), and an AI engine (108) is located at a server (304). In an embodiment, the electronic device (102) can be located at the client (302), and the AI engine can be located at the server (304).

FIG. 4 illustrates a schematic diagram depicting an AI engine at a server (400), according to an exemplary implementation of the disclosure.

The AI engine (108) includes voice authentication unit (408), a voice filtering unit (410), a feature extractor (412), a sentimental analyser (414), an incremental machine learning system (416), a database (234), an analyser (222), a natural language processing unit (418), a short-term memory for ongoing conversation (432), and a short-term memory for user intent/instructions/information (434). The AI engine (108) receives the first context data (402), the user input (404), and the supplementary data (406) from an electronic device (102).

The voice authentication unit (408) is configured to authenticate the user using the voice recognition technique, in which at least one voice matches the voice signature stored in the database (234).

The voice filtering unit (410) is configured to analyse the voice of the user and then filter out the content which is the most probable source of the information. In a case, when multiple users are speaking, then the voice filtering unit (410) is configured to identify the nearest voice and then accordingly filters out the other voices. Further, if the voice authorization is enabled, then the voice filtering unit (410) identifies the authorized voice and filters out the other voices. In a case, a conversation is detected between the selected user, and some other user/(s), then the voice filtering unit (410) discard the portion of a conversation. If the selected voice of the user is very far, then the voice filtering unit (410) also discarded the voice. The output of the voice filtering unit (410) then processed to extract various features of the voice including, but are not limited to, tone, pitch, breadth, etc. In an embodiment, the feature extractor (412) is configured to extract features of the voice including, but are not limited to, tone, pitch, breadth, etc.

The natural language processing unit (418) is configured to extract features and helps to analyse the sentiments, along with the sentence structure. The natural language processing unit (418) includes a vocabulary (420), a speech to text convertor (422), the database (234), a language pattern recognizer (424), a dialog flow processor (426), a language interpreter (428), and a natural language generator (430).

In an embodiment, the natural language processing unit (418) is configured to provide the most probable intent of the user from the command, the second context data, and the previous conversational details. In an embodiment, the context refers to what the user was doing before the call came. For example, if the user is searching restaurant and finally books it, and if the user gives instructions to tell the location of the booked restaurant to the caller, then this information is stored in the database (234). In another example, if the user uses some short form to convey his intent, then the stored previous details/information can be used to derive the intent of the user. For example, if a husband always answers his returning time when his wife calls in the evening, and one day when his wife calls him, he just said 9:00 pm, then the system (100) takes input from the previous stored conversation, and would deduce the most probably the returning time of the user and accordingly the answer to wife. After understanding the intent of the user, it stores in the short-term memory (434). The stored intent of the user can be used multiple times, if the user uses specific short form to convey his intent regularly.

The vocabulary (420) includes a specific word or a group of words used in a particular language. The speech to text convertor (422) is configured to convert the speech of the user (i.e. the command/instructions/information/user intent) in a textual form. The database (234) is configured to store user's details, and the other information pertaining to the user. The language pattern recognizer (424) is configured to recognize a pattern to identify a language based on linguistic skills. The dialog flow processor (426) is configured to determine conversation context including dialogue history, location and user preferences. The language interpreter (428) is configured to interpret a language based on pitch/tone of the caller. The natural language generator (430) is configured to generate one or more conversational threads based on the interpreted language. In an embodiment, natural language processing unit (418) is configured to find the most probable intent of the call and then forms the dialog and decides the tone in which dialogue is to be delivered, depending upon the category of the caller, intent of the caller, sentiments of the caller, the information/instructions provided by the user, and previous conversation details with the caller. If in a case, more information has to be delivered to the caller, then the natural language processing unit (418) either convey its lack of competency in answering to the caller, or output a message to the user asking for extra information. In an embodiment, the natural language processing unit (418) can also check for information in the electronic device (102), if the information is authorized, the natural language processing unit (418) transmit the information to the caller based on the relationship or a pre-setting information.

The sentimental analyser (414) is configured to analyse sentiments of the user, when the user gives instructions and information (i.e. command) for the conversation with the caller and then can be used to categorize different users (for example, ongoing conversation), and further stored in the short term-memory for ongoing conversation (432). In an embodiment, the sentimental analyser (414) is configured to analyse sentiments of the caller, in the initiation of the call, and analyse changes in the sentiments during the call and the final sentiments of the caller as the call ends and can be used for the categorizing/clustering of the user.

In an exemplary embodiment, the use of a smart watch (102e) in attending the virtual assistant (106) call, in a following way:

Step 1: A lady is in a gym, and she receives an incoming call of boss.

Step 2: The detection module (206) understands that the lady is in gym by detecting context data including location information and accelerometer inputs.

Step 3: The microphone is enables and the lady's voice input is taken after a beep.

Step 4: The lady then gives instructions and information to attend the call to the virtual assistant (106).

Step 5: The virtual assistant (106) attends the call.

The incremental machine learning system (416) is configured to cluster the user on the basis of the previous conversational details, user's feedbacks, and their sentiments before and after the conversation with the caller. The number of categories of the clusters depends upon the complexity of the natural language processing (NLP). These categories can be as many as the number of the ways, and the natural language processing (NLP) can form the final deliverable output for all the possible scenarios. As the number of the categories would increase, the incremental machine learning system (416) would increase the learning time, and effectiveness of the system (100).

In an embodiment, the incremental machine learning system (416) is configured to cluster the user based on user's instructions, duration of the call, frequency of the call, response of the caller, and feedback of the user. In the user's instructions, if the user gives the instructions for a caller, to talk in a friendly manner, then it increases the probability that the caller is a friend. The response of the caller can be processed to determine how effectively and interestingly the caller answers the call. It also determines the knowledge of the user. The response can be used to determine the characteristic of the caller, which then can be used as an input to the incremental machine learning system (416). The feedback of the user helps to determine the accuracy of the clustering.

In an embodiment, the incremental machine learning system (416) is configured to cooperate with the database (234). The incremental machine learning system (416) extracts caller details, or other relevant information pertaining to the caller, from the database (234). The incremental machine learning system (416) updates the profiles/information of the user in the database (234) after each iteration of attending the call and if an update is required.

The analyser (222) is configured to analyse the user intent/instruction/information.

In an exemplary embodiment, the virtual assistant (106) is configured to differentiate of information and instruction received from the user. The voice input of the user contains both the instructions and information (message) to attend the call with the caller. The Natural Language Processing unit (418) differentiates between the information and instruction, then use the information to deliver the content and in a way given in the instruction.

Scenario 1: The Voice Input Contains Both the Instruction and the Information

Call: Wife is calling

Voice Input by the user: "Please tell her that I am in a meeting and would return by 9:00 PM. Also, if she asks about the specifics of the meeting then only tell her that it's with Mr. Park."

Information: "That the user will return by 9:00 PM and he has meeting with Mr. Park."

Instruction: "Tell her about the specifics of the meeting only if she asks for it"

The Natural Language Processing unit (418) will parse the voice input classify them in information and instruction. The Natural Language Processing unit (418) will also link each instruction with the information. For example, the only instruction in the above example is linked to the second information that is "he has meeting with Mr. Park". The Natural Language Processing unit (418) will generate the dialogue based on Caller's dialogues, the previous conversation and information provided by the Caller but the Natural Language Processing unit (418) uses (or in some cases do not use it) the information based on the set of instructions linked to it. The Natural Language Processing unit (418) also restricts information based on at least one or a combination of the pre-setting information, user's instructions, user's information, caller's information, sensor information, or context related information, wherein the user's information include location information, calendar data, and other user related information. For example, a user gives instructions that "Please deliver the specific of the meeting only after my wife's voice is authenticated". The system (100) automatically detects the restricted information, and authenticates the wife's call by generating a one-time password (OTP) and share the same on the wife's device. When the wife's enters the OTP, the system (100) automatically authenticates the wife, and provides the meeting details to her. For other users, the meeting details will not be shared.

Few Examples of the Instructions:

1. "Please deliver the specific of the meeting only after my wife's voice is authenticated".

2. "Please deliver the message only if you are sure that my wife is talking and make sure of it by asking question about our previous conversation".

3. "Mr. Choi some time speaks very angrily and if speaks angrily, speak in a mild tone but also don't provide him any further information".

Scenario 2: The Voice Input Contains Just the Instructions

Call: Office employee is calling

Voice Input by the user: "Please don't pick up the phone"

Information: Nil

Instruction: "Do not the pick up the phone"

In this case, the Natural Language Processing unit (418) will parse the voice input to understand that the intent of the user is not to pick up the phone and virtual assistant will then accordingly will not pick up the phone.

FIG. 5 illustrates a schematic diagram (500) depicting an example of a switching module of an electronic device of FIG. 2, according to an exemplary implementation of the disclosure. In FIG. 5, a caller (502) is connected with a user over a switch (510) (i.e. phone line). In an embodiment, the switch (510) is a part of the electronic device (102). When the detection module (206) detects a call from a caller (502) over a switch (510), the switching module (208) configured to enable the microphone in three cases. In a first case, either a user or a virtual assistant (106) connects with the caller (502). The user can be a passive reader (504). In a second case, a user (506) is connected with the caller (502). In a third case, the virtual assistant and user both are connected simultaneously. In the third case, the user can listen the conversation between the virtual assistant and the caller, as a passive listener (508).

FIG. 6 illustrates a schematic diagram for call purpose prediction (600), according to an exemplary implementation of the disclosure.

In FIG. 6, previous conversational details, social media data, and other application data are used to predict the purpose of the call. In an embodiment, the call purpose prediction is a subset of a second context data. The system (100) is configured to detect call information (602). The database (232) is configured to store the information. The call information (602) includes caller's name, current time, current date, caller's service, caller's location, caller's social media profile, and other information pertaining to the caller. The call information (602) then transmit to an information matching unit (606). The information matching unit (604) is configured to receive the call information (602), and the stored data from the database (232), and match the call information with the stored data, and determine a set of relevant information (606). The set of relevant information (606) includes information in detail (for example, Information-1, Information-2, Information-3). The set of relevant information (606) is then transmit to a virtual assistant (106). The virtual assistant (106) uses the received information and determine the most probable purpose of the call. In an embodiment, the purpose of the call is used to understand the short instruction and prepare one or more conversational threads. Optionally, the probable purpose can also be displayed in a textual form on the display unit (216) of the electronic device (102).

FIG. 7 illustrates a schematic diagram for instruction extraction (700), according to an exemplary implementation of the disclosure.

In FIG. 7, the system (100) extracts correct instructions/ commands of the user. The system (100) differentiates the user instructions targeted for the virtual assistant (106) and other voices. There can be many voices in the recording environment. The virtual assistant (106) analyses the voices, and extracts the instructions from it. In this, the user does not need to end the talk to give instruction to the virtual assistant (106).

The voice filtering unit (702) is configured to analyse the voice of the user and then filter out the content which is the most probable source of the information. The voice authentication unit (704) authenticates the user by using the voice recognition technique, in which at least one voice matches the voice signature stored in the database (234). A conversation flow diagram (706) includes multiple speech contents, such as a speech-content-1 (voice-1) (708), a speech-content-2 (voice-2) (710), a speech-content-3 (voice-3) (712), a speech-content-4 (voice-4) (714), and a speech-content-5 (voice-5) (716). The speech-content-3 (voice-3) (712) and the speech-content-5 (voice-5) (716), are authenticated by the voice authentication unit (704), where the users of the speech-content-3 (voice-3) (712) and the speech-content-5 (voice-5) (716), can give instructions. A flow detection unit (718) is configured to cooperate with the conversation flow diagram (706) to take input of the speech-content-3 (voice-3) (712) and the speech-content-5 (voice-5) (716), when the microphone is switched ON, while receiving the call. The flow detection unit (718) further analyses the speech-content-3 (voice-3) (712) and the speech-content-5 (voice-5) (716), and captures the speech-content-3 (voice-3) (712) and the speech-content-5 (voice-5) (716) based on following techniques:

a. If the speech-content-3 (voice-3) (712) or the speech-content-5 (voice-5) (716) give instructions out of flow, then select at least one speech as a command. Here, out of flow refers to instructions which are out of a given context.

b. If the speech-content-3 (voice-3) (712) or the speech-content-5 (voice-5) (716) give instructions and matches the most probable purpose, then select at least one speech as a command.

c. If the user gives command with a specific user instruction template (for example, can you please inform him that I will be late today?).

User: Can you please inform my wife that I will be late today?

The virtual assistant (Bixby®) receives the call automatically, and takes data from sensors and form a reply, and convey to the wife.

Bixby®: I am in meeting, I will be late today.

FIG. 8 illustrates a flow diagram for short instruction understanding using previous conversation details (800), according to an exemplary implementation of the disclosure.

In FIG. 8, the system (100) provides understanding of short instructions of a user using previous conversational details. The virtual assistant (106) may create its own based on the analyzed situation. In an exemplary embodiment, a user provides an instruction (802) via an electronic device (102). The system (100) checks whether the user's instruction (802) is a short instruction (808). If the user's instruction (802) is not short, then the system (100) automatically transmit the user's instruction to the virtual assistant (106). If the user's instruction (802) is short, then it transmits to an instruction template identifier (804). The instruction template identifier (804) is configured to search all previous user's instructions stored in a database (234), and is further configured to identify the most probable instruction template (806) with respect to the user's instruction (802) and the most probable purpose. The instruction template (806) then transmit to the virtual assistant (106). The database (234) is configured to store most-probable purpose. More specifically, the user's instruction (802) and the most probable purpose is used to find the most probable instruction template (806). The instruction then filled in the instruction template (806). The full instruction of the instruction template (806) then transmit to the virtual assistant (106). The virtual assistant (106) transmits the instruction to the database (234) to store the instruction and the most-probable purpose.

In an exemplary embodiment, methods of message delivery include:

a. The message is delivered in one go more like playing a recorded message to the caller. This does not require an intelligent system.

b. Not delivering any message.

c. Conversational Message Delivery System

Not delivering any message: In this, the message is not delivered, but just the information is extracted from the caller. For example:

Call: Call from the delivery boy (user is not sure about who is calling)

Voice Input: "Just ask who the Caller is and why he has called and then deliver the information back tone"

The back tone refers to a caller ring back tone, which is heard by the caller while waiting for the information to be answered.

In this case, the Natural Language Processing unit (418) will be required. The Natural Language Processing unit (418) would only take input from the Caller like what's his name and what's the purpose of the call and so on. The information given by the Caller would be finally shown to the user in his preferred form.

Conversational Message Delivery System: In this system, the user gives the instruction and information to converse with the caller. The Natural Language Processing unit (418) uses this information to converse with the caller, in a following way.

Call: Call from the restaurant manager

Voice Input: "Ask the manager to book a table for five people preferably near the lake side, around 9:00 PM. Also provide my details required to book the table and ask him what will be the tentative cost of dining for five people.

Conversation: Manager: Hello I am Mr. Henry, calling from hotel grand.

VA: Hello sir I am virtual assistant of Mr. Park.

Manager: ok, Mr. Park asked me to book a table, can you provide the details of the booking.

VA: Yes, please book a table for five people preferably near the lake side at 9:00 PM for dinner.

Manager: ok I will check if the lake side is available, I will book it.

VA: Apart from it can you also tell me how much it will cost.

Manager: Average cost of dinning is around 20$ per person.

VA: Thank you

Manager: You are welcome

The virtual assistant also pops a message showing that it costs around 20$ for dinning at hotel grand. FIG. 9 illustrates a flowchart (900) depicting a method for managing a command based interactive call, according to an exemplary implementation of the disclosure.

The flowchart (900) starts at step (902), detecting an incoming call from a caller on an electronic device (102). In an embodiment, a detection module (206) of an electronic device (102) is configured to detect an incoming call from a caller.

At step (904), detecting, by the electronic device (102), at least one or a combination of a user input, first context data of the call, and pre-setting information. In an embodiment, the detection module (206) of the electronic device (102) is configured to detect at least one or a combination of a user input, first context data of the call, and pre-setting information.

At step (906), enabling the electronic device (102) to receive a command from a user, wherein the command is not recognized by the caller. In an embodiment, a switching module (208) is configured to enable the electronic device (102) to receive a command from the user.

At step (908), recording the command to be provided by the user. In an embodiment, a recording module (210) is configured to record the command to be provided by the user. The recording module (210) includes a microphone.

At step (910), analyzing the recorded command by detecting at least one or a combination of second context data, the pre-setting information, and a pre-defined category. In an embodiment, an analyser (222) is configured to analyse the command by detecting at least one or a combination of the context data, the pre-setting information, and a pre-defined category.

At step (912), generating one or more conversational threads based on the analysed command. In an embodiment, the analyser (224) is configured to generate one or more conversational threads based on the analysed commands.

At step (916), transmitting the one or more conversational threads to the caller during a conversation with the caller. In an embodiment, a communication module (226) is configured to transmit the one or more conversational threads to the caller during a conversation with the caller.

FIG. 10 illustrates a flowchart depicting a method for detecting context data from an incoming call, according to an exemplary implementation of the disclosure.

The flowchart (1000) starts at step (1002), detecting an incoming call from a caller on an electronic device (102). In an embodiment, a detection module (206) of an electronic device (102) is configured to detect an incoming call from a caller.

At step (1004), detecting, by the electronic device (102), at least one or a combination of a user input, first purpose context data of the call, and pre-setting information. In an embodiment, the detection module (206) of the electronic device (102) is configured to detect at least one or a combination of a user input, first purpose context data of the call, and pre-setting information.

At step (1006), enabling the electronic device (102) to receive a command from a user, wherein the command is not recognized by the caller. In an embodiment, a switching module (208) is configured to enable the electronic device (102) to receive a command from the user.

At step (1008), recording the command to be provided by the user. In an embodiment, a recording module (210) is configured to record the command to be provided by the user. The recording module (210) includes a microphone.

At step (1010), analysing the command and first answer context data. In an embodiment, a context analysis module (232) is configured to analyse the command and first answer context data.

At step (1012), determining at least one or a combination of second purpose context data from an initial conversation from a caller, and the pre-setting information. In an embodiment, a context analysis module (232) is configured to determine at least one or a combination of second purpose context data from an initial conversation with a caller.

At step (1014), matching the second purpose context data with the first answer context data. In an embodiment, the context analysis module (232) is configured to match the second purpose context data with the first answer context data.

At step (1016), generating one or more conversational threads based on the matched data. In an embodiment, the context analysis module (232) generates one or more conversational based on the matched data.

At step (1018), transmitting the one or more conversational threads during the conversation with the caller. In an embodiment, the context analysis module (232) is configured to transmit the one or more conversational threads during the conversation with the caller.

FIG. 11 illustrates a flowchart depicting steps for receiving an incoming call by a virtual assistant, according to an exemplary implementation of the disclosure.

The flowchart (1100) starts at step (1102), receiving an incoming call from a caller on an electronic device (102). In an embodiment, a detection module (206) is configured to receive an incoming call from a caller on an electronic device (102). At step (1104), detecting, by the electronic device (102), at least one or a combination of a user input, a first context data, or pre-setting information. In an embodiment, the detection module (206) is configured to detect at least one or a combination of a user input, a first context data, or pre-setting information. At step (1106), checking whether the user input, the first context data, or the pre-setting information are detected or not. If the user input, a first context data, or pre-setting information are detected, processing normal call, as shown in step (1108). If it is detected, switching ON microphone, wherein the voice of a user is a not recognized by a caller, as shown in step (1110). In an embodiment, a switching module (208) is configured to switch ON microphone. At step (1112), detecting a voice message by a user. In an embodiment, the user provides the voice message by using the microphone. At step (1114), analysing the user's voice message and generating one or more conversational threads. In an embodiment an analyser (222) is configured to analyse the user's voice message, and generate one or more conversational threads. At step (1116), transmitting one or more conversational threads to the caller. In an embodiment, a communication module (226) is configured to transmit the conversational threads to the caller.

FIG. 12 illustrates a flowchart (1200) depicting steps for activating a microphone, according to an exemplary implementation of the disclosure.

The flowchart (1200) starts at step (1202), receiving an incoming call from a caller on an electronic device (102). In an embodiment, a detection module (206) is configured to receive an incoming call from a caller on an electronic device (102). At step (1204), detecting, by the electronic device (102), at least one or a combination of a user input, a first context data, or pre-setting information. In an embodiment, the detection module (206) is configured to detect at least one or a combination of a user input, a first context data, or pre-setting information. At step (1206), checking whether the user input, the first context data, or the pre-setting information are detected or not. If the user input, a first context data, or pre-setting information are detected, processing normal call, as shown in step (1208). If it is detected, switching ON microphone, wherein the voice of a user is a not recognized by a caller, as shown in step (1210). In an embodiment, a switching module (208) is configured to switch ON microphone. At step (1212), switching ON microphone during a complete call, pre-defined time interval, or a response time. At step (1214), detecting a voice message by a user. In an embodiment, the user provides the voice message by using the microphone. At step (1216), analysing the user's voice message and generating one or more conversational threads. In an embodiment an analyser (222) is configured to analyse the user's voice message, and generate one or more conversational threads. At step (1218), transmitting one or more conversational threads to the caller. In an embodiment, a communication module (226) is configured to transmit the conversational threads to the caller.

FIG. 13 illustrates a flowchart depicting steps for verifying user authentication for answering an incoming call, according to an exemplary implementation of the disclosure.

The flowchart (1300) starts at step (1302), receiving an incoming call from a caller on an electronic device (102). In an embodiment, a detection module (206) is configured to receive an incoming call from a caller on an electronic device (102). At step (1304), detecting, by the electronic device (102), at least one or a combination of a user input, a first context data, or pre-setting information. In an embodiment, the detection module (206) is configured to detect at least one or a combination of a user input, a first context data, or pre-setting information. At step (1306), checking whether the user input, the first context data, or the pre-setting information are detected or not. If the user input, a first context data, or pre-setting information are detected, processing normal call, as shown in step (1308). If it is detected, switching ON microphone, wherein the voice of a user is a not recognized by a caller, as shown in step (1310). In an embodiment, a switching module (208) is configured to switch ON microphone. At step (1312), authorizing voice of the user. In an embodiment, the voice authentication unit (408) is configured to authorize voice of the user. At step (1314), checking whether the voice of the user is authorized or not. If the voice of the user is not authorized, go back to step (1310), switching ON microphone. If the voice of the user is authorized, detecting a voice message by a user, as shown in step (1316). In an embodiment, the user provides the voice message by using the microphone. At step (1318), analysing the user's voice message and generating one or more conversational threads. In an embodiment an analyser (222) is configured to analyse the user's voice message and generate one or more conversational threads. At step (1320), transmitting one or more conversational threads to the caller. In an embodiment, a communication module (226) is configured to transmit the conversational threads to the caller.

FIG. 14 illustrates a flowchart depicting steps for receiving an incoming call, according to an exemplary implementation of the disclosure.

The flowchart (1400) starts at step (1402), detecting an incoming call from a caller on an electronic device (102). In an embodiment, a detection module (206) is configured to receive an incoming call from a caller on an electronic device (102). At step (1404), detecting, by a virtual assistant (106), at least one or a combination of a user input, a first context data, or pre-setting information. In an embodiment, the virtual assistant (106) is configured to detect at least one or a combination of a user input, a first context data, or pre-setting information. At step (1406), checking whether the user input, the first context data, or the pre-setting information are detected or not. If the user input, a first context data, or pre-setting information are detected, processing normal call, as shown in step (1408). If it is detected, picking, by a virtual assistant (106), the incoming call without user involvement, as shown in step (1410). In an embodiment, the virtual assistant (106) is configured to automatically pick up the incoming call of the call without user involvement. At step (1412), enabling, by the virtual assistant (106), the electronic device (102) to receive a voice command from a user, wherein the voice command is not audible to the caller. In an embodiment, the virtual assistant (106) is configured to enable the electronic device (102) receive a voice command from a user, wherein the voice command is not audible to the caller. At step (1414), recording, by the virtual assistant (106), the voice command provided by the user. In an embodiment, the virtual assistant (106) is configured to record the voice command provided by the user. At step (1416), analysing, by the virtual assistant (106), the recorded command by detecting at least one or a combination of second context data, the pre-setting information, and a pre-defined category. In an embodiment, the virtual assistant (106) is configured to analyse the recorded command by detecting at least one or a combination of second context data, the pre-setting information, and a pre-defined category. At step (1418), generating, by the virtual assistant (106), one or more conversational threads based on the analysed command. In an embodiment, the virtual assistant (106) is configured to generate one or more conversational threads based on the analysed command. At step (1422), transmitting, by the virtual assistant (106), the one or more conversational threads to the caller during a conversation with the caller. In an embodiment, the virtual assistant (106) is configured to transmit the one or more conversational threads to the caller during a conversation with the caller.

FIG. 15 illustrates a flowchart depicting steps for displaying conversation to a user on run time, and key information, according to an exemplary implementation of the disclosure.

The flowchart (1500) starts at step (1502), receiving an incoming call from a caller on an electronic device (102). In an embodiment, a detection module (206) is configured to receive an incoming call from a caller on an electronic device (102). At step (1504), detecting, by the electronic device (102), at least one or a combination of a user input, a first context data, or pre-setting information. In an embodiment, the detection module (206) is configured to detect at least one or a combination of a user input, a first context data, or pre-setting information. At step (1506), checking whether the user input, the first context data, or the pre-setting information are detected or not. If the user input, a first context data, or pre-setting information are detected, processing normal call, as shown in step (1508). If it is detected, switching ON microphone, wherein the voice of a user is a not recognized by a caller, as shown in step (1510). In an embodiment, a switching module (208) is configured to switch ON microphone. At step (1512), detecting a voice message by a user. In an embodiment, the user provides the voice message by using the microphone. At step (1514), analysing the user's voice message and generating one or more conversational threads. In an embodiment an analyser (222) is configured to analyse the user's voice message, and generate one or more conversational threads. At step (1516), transmitting one or more conversational threads to the caller. In an embodiment, a communication module (226) is configured to transmit the conversational threads to the caller. At step (1518), displaying conversational history to the user on run time. In an embodiment, a display unit (216) is configured to display conversational history to the user on run time. At step (1520), displaying key information from the caller to the user. In an embodiment, the display unit (216) is configured to display key information from the caller to the user.

FIG. 16 illustrates a flowchart (1600) depicting steps for matching purpose context data and answer context data from user's message, according to an exemplary embodiment of the disclosure.

The flowchart (1600) starts at step (1602), receiving an incoming call from a caller on an electronic device (102). In an embodiment, a detection module (206) is configured to receive an incoming call from a caller on an electronic device (102). At step (1604), detecting, by the electronic device (102), at least one or a combination of a user input, a first context data, or pre-setting information. In an embodiment, the detection module (206) is configured to detect at least one or a combination of a user input, a first context data, or pre-setting information. At step (1606), checking whether the user input, the first context data, or the pre-setting information are detected or not. If the user input, a first context data, or pre-setting information are detected, processing normal call, as shown in step (1608). If it is detected, switching ON microphone, wherein the voice of a user is not audible to a caller, as shown in step (1610). In an embodiment, a switching module (208) is configured to switch ON microphone. At step (1612), receiving a call, by a virtual assistant (106), in background, and start initial conversation with the caller. At step (1614), detecting a voice message by a user. In an embodiment, the user provides the voice message by using the microphone. At step (1618), analysing the user's voice message and determining first answer context data, and generating a first conversational message. In an embodiment a context analysis module (232) is configured to analyse the user's voice message and determine first answer context data, and generate a first conversational message. At step (1616), determining, by the virtual assistant (106), second context data from the initial conversation. At step (1620), check whether second purpose context data and first answer context data are matched. If the second purpose context data and first answer context data are matched, transmitting one or more conversational threads to the caller, as shown in (1622). In an embodiment, a communication module (226) is configured to transmit the conversational threads to the caller. If the second purpose context data and first answer context data are not matched, generating a second conversational message.

FIGS. 17A-17E illustrate use-case scenarios depicting answering phone calls by a virtual assistant, according to an exemplary implementation of the disclosure.

FIG. 17A illustrates a use-case scenario depicting answering phone calls by a virtual assistant, according to an exemplary implementation of the disclosure. In this scenario (1700a), an electronic device (102) is associate with a user. The user's electronic device (102) generates a call ring, as shown in step (1702a). After 5 seconds threshold, microphone of the electronic device (102) gets ON, as shown in step (1704a). The microphone gets on with a beep sound, as shown in step (1722a). The microphone gets ON for 10 seconds with a beep sound, as shown in step (1706a). In 5 seconds, a user tab start virtual mode, and call ring goes on MUTE mode, as shown in step (1708a). The benefit of ring's MUTE mode is to save battery life of phone, avoid disturbance, and less power consumption, as shown in step (1720a). At step (1710a), user provides instructions. At step (1712a), after 5 seconds of silence, microphone gets OFF. At step (1714a), a virtual assistant (106) starts conversation with a caller. At step (1724a), microphone gets OFF after detecting silence. At step (1716a), a user can view the virtual assistant mode conversation in between. At step (1718a), a user can give text and voice instructions to the caller. At step (1726a), a user provides reply in between the conversation.

FIG. 17B illustrates a use-case scenario depicting answering phone calls by a virtual assistant, according to an exemplary implementation of the disclosure. In this scenario (1700b), a user drives a vehicle and a call gets from a caller. At step (1702b), user phone rings and the user activates the virtual assistant mode. At step (1704b), the virtual assistant (106) takes input from a plurality of sensors (i.e. driving, location, calendar, and map data, at step (1710b)), and form a proper reply for the caller. At step (1708b), the virtual assistant (106) picks the call and start conversation with the caller. At step (1706b), the virtual assistant (106) handles the call based on the user message/instructions. The virtual assistant (106) also provides user information if permitted, based on other sensor(s)/user related information. For example, a user is driving, and he got an incoming call from his wife. He activates VA mode. The virtual assistant (106) receives the call automatically and takes caller concern "Caller: When you reach home". The virtual assistant (106) takes data from sensors and form a reply. "VA: I am Driving. I will reach home in 15 minutes", and convey it to his wife. The virtual assistant (106) converts this conversation in text/audio form and save it for user.

FIG. 17C illustrates a use-case scenario depicting answering phone calls by a virtual assistant, according to an exemplary implementation of the disclosure. In this scenario (1700c), a microphone gets ON when user shake the phone. In an incoming call, the microphone gets when user shakes the phone, and the user provides voice message and the virtual assistant (106) takes care of the conversation.

FIG. 17D illustrates a use-case scenario depicting answering phone calls by a virtual assistant, according to an exemplary implementation of the disclosure. In this scenario (1700d), a virtual assistant (106) initiates the call, when disconnected while receiving user's message on ongoing/ringing call transmit the message. At (1702d), a user gets a call from a caller. At (1704d), the user provides voice message on a VA mode, when call gets disconnected before receiving the user's message completely. At (106d), the virtual assistant (106) initiates a call, and generate conversational threads.

FIG. 17E illustrates a use-case scenario depicting answering phone calls by a virtual assistant, according to an exemplary implementation of the disclosure. In this scenario (1700e), decoy response is generated. For example, a husband calling to wife, as shown in (1702e). His wife is planning birthday party for the husband, and she gets a call, as shown in (1704e). Someone from home also calling her, as shown in (1706e). In this, the virtual assistant (106) handles the call of both, and reply to both. The virtual assistant (106) replies to the husband that "I am at Grocery Store", as shown in (1708e). The reply is a decoy response. The virtual assistant (106) considers previous conversational details, calendar data, and previous user's feedback. The previous conversational details include previous conversation with other contacts, for example, she was inviting other contact for his birthday party. The virtual assistant (106) match define words for decoy reply, for example, saying don't share my husband it's a surprise. Further, the virtual assistant (106) checks calendar data, for example today is his birthday. Furthermore, the virtual assistant (106) checks previous user's feedback provided in same situation, and other factors. The virtual assistant (106) replies to the other caller as well, as shown in (1710e). For example, the virtual assistant (106) replies "yes tell him that party will start at 7 pm". In this, the virtual assistant (106) considers previous conversation details and context data, what he is asking.

FIG. 18 illustrates a flow diagram (1800) for generation of a decoy response, according to an exemplary implementation of the disclosure.

In FIG. 18, a virtual assistant (106) is configured to generate a decoy response. The virtual assistant (106) is configured to generate a decoy response based on pre-determined conditions, and provide the decoy response to the caller. The decoy response is generated based on three factors, i.e., When to give?
Whom to give?
What to give?

In an exemplary embodiment, a user receives a call from a caller. A detection module (206) is configured to detect an incoming call from the caller on a user's device (102). The detection module (106) is further configured to detect at least one or a combination of a user input, first purpose context data of the call, and pre-setting information. A switching module (106) is configured to automatically switch ON the microphone of the user's device (102) to receive a voice command/instruction from the user. When the microphone gets switch ON, the user gives the voice command/instructions to a virtual assistant (106) to handle the call. For example, as shown in a step (1802), the user gives a voice command "Please handle . . . " to the virtual assistant (106). After receiving the voice command, the VA mode automatically gets activated, as shown in (1804). In an embodiment, the voice command is not audible to the caller.

The virtual assistant (106) analyses the received command, by detecting at least one or a combination of second context data, the pre-setting information, and a pre-defined category of the caller. The virtual assistant (106) subsequently performs tasks including situation detection of a user (1806), identification of a targeted user (1808), and generation of one or more conversational threads (1810).

In an embodiment, the virtual assistant (106) automatically learns the situation (1812), and then perform the action (1814). The virtual assistant (106) considers following parameters for situation analysis, as shown in (1816) which explains a factor "When to give".

1. User's instructions to give a decoy reply.
2. User is planning a surprise/gift.
3. Any embarrassment situation of the user.
4. User's previous conversation details.
5. User's feedback on previous reply.
6. Stored keywords, such as surprise, don't tell, disclose, secret, lie, etc.
7. Scheduler data like calendar data, and event handler.

Based on the learning (1812), the virtual assistant (106) performs action. More specifically, the virtual assistant (106) learns the situation from other data. The action is performed based on the situation detection of a user (1806), identification of a targeted user (1808), and generation of decoy response (1810).

The virtual assistant (106) performs the situation detection (1806) by identifying that a situation has aroused. The virtual assistant (106) hides information without letting the caller know that the virtual assistant (106) has hidden information. In this situation, the virtual assistant (106) needs to provide a decoy response. The situation can be identified either by interpreting the user's prior instructions for the decoy response or can be understood by learning from other data such as previous conversation, application data, social media data etc. The virtual assistant (106) interprets the voice command/user's prior instructions for a decoy response. For example, the user gives the instruction to hide all the information related to the birthday party with wife. Then, all the information related to the birthday party is marked, and decoy is enabled for the husband and his close friends from where the information leak can occur. In this case, if in a conversation phrase like 'surprise', 'secret', or 'don't tell anybody' is identified, then the conversation is analyzed to map possible decoy situations and store it in a database (234).

The virtual assistant (106) performs the identification of the target user (1808) because the information to be hidden cannot be hidden from each user. The identification of the target user can be identified from the prior instruction given by the user. The target user can also be identified by analyzing the previous conversation details. For example, the prior instruction given by the user includes if a surprise party for wife is being organized then in that case all the information related to the party must be hidden from the wife but cannot be hidden from the guests or an organizer. The previous conversation details include, for example, in a conversation if a phrase like 'surprise', 'secret', 'don't tell anyone' is identified then the whole conversation is analyzed to map the target user.

The virtual assistant (106) generates the decoy response (1810) after identifying the decoy situation and the target user. The decoy response can be extracted from the instruction given by the caller or can be generated using other data such as:

a. The regular schedule of the user at the time of call: If the user goes regularly to the gym at the time the decoy situation aroused, then in that case decoy response would be generated considering that the user is gym and doing normal activity.

b. Database (234) of all the previously used Decoy responses.

c. Any well-crafted Decoy response to meet the user's schedule: If the user is going to be busy for next two hours, then the decoy response can be generated so that busyness of two hours is communicated to the caller.

In an embodiment, the decoy response can also be fed by the user in advance for specific decoy situation and the target user, or it can be understood by the virtual assistant (106).

In FIG. 18, one of the possible implementations using instruction interpretation has been illustrated. The user's instruction is interpreted to identify all the components, the information to be hidden, the target user from which the information is to be hidden and the possible decoy response which can be used to hide the information. The next part is to monitor the on ongoing conversation so as to identify that a decoy situation has aroused and the virtual assistant (106) needs to hide the information without letting the caller know about it. In this case, the virtual assistant (106) checks in to the database (234) all the information and their corresponding decoy responses used previously. If one or more than one possible decoy response is identified, then either randomly or which fits the situation is selected and transmitted to the caller.

For an action "Whom to give decoy response", the virtual assistant (106) performs following functionalities, as shown in (1818):

1. Find situation after considering scenarios.
2. Check user's previous conversation details.
3. Check a database for define words.
4. Learn from a user's feedback.

For generation of a decoy response for the targeted user, the virtual assistant (106) performs following functionalities:

1. Generating a conversational message.
2. Transmitting to the target user. The main advantages of a command based interactive system and a method thereof, are as follows:
   automatically managing an incoming call;
   managing user's expressions by using a virtual assistant as per caller's behavior;
   managing one or more incoming calls at a time;
   determining the importance of the incoming call without attending the call by the user;
   saving user's time by avoiding unnecessary talk over the phone calls; and
   saving caller's response for future assistant, as per importance.

It should be noted that the description merely illustrates the principles of the disclosure. It will thus be appreciated that those skilled in the art will be able to devise various arrangements that, although not explicitly described herein, embody the principles of the disclosure. Furthermore, all examples recited herein are principally intended expressly to be only for explanatory purposes to help the reader in understanding the principles of the invention and the concepts contributed by the inventor(s) to furthering the art and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method performed by an electronic device to manage a command based interactive call, the method comprising:
    detecting an incoming call from a caller;
    detecting at least one of a combination of a user input, first context data of the incoming call, and pre-setting information;
       receiving a command from a user, wherein the command is not recognized by the caller;
       recording the command received from the user;
       analyzing the recorded command by detecting at least one of second context data, the pre-setting information, or a pre-defined category;
       generating one or more conversational threads based on the analyzed command; and
       transmitting the one or more conversational threads to the caller, during a conversation with the caller.

2. The method of claim 1, further includes storing, in a database, information related to the user, a plurality of callers associated with the user, pre-defined categories for each caller, and pre-setting information.

3. The method of claim 1, wherein the command includes a voice command or a text command.

4. The method of claim 1, wherein the first context data and second context data comprise a purpose of a call, usage data, current activities of the user, a pre-stored user schedule, sensor data, a time of the call, a location of the call, a relationship with the caller, a category of the caller, a previous calling history and conversation details, a voice tone, a speed of talking, and a frequency of calls between the user and the caller.

5. The method of claim 1, wherein the transmitting comprises transmitting one or more portions of each of the conversational threads to the caller during a conversation with the caller.

6. The method of claim 1, further comprising:
    determining at least one of the second context data of the incoming call or the pre-setting information.

7. The method of claim 1, further comprising:
    picking, by a virtual assistant, the incoming call in the conversation with the caller; and
    generating, by the virtual assistant, the one or more conversational threads.

8. An electronic device to manage a command based interactive call, the electronic device comprising;
    a transceiver; and
    at least one processor coupled with the transceiver, wherein the at least one processor is configured to:
       detect an incoming call from a caller,
       detect at least one of a combination of a user input, first context data of the incoming call, and pre-setting information,
       receive a command from a user, wherein the command is not recognized by the caller,
       record the command received from the user,
       analyze the recorded command by detecting at least one of second context data, the pre-setting information, or a pre-defined category,
       generate one or more conversational threads based on the analyzed command, and
       transmit the one or more conversational threads to the caller, during a conversation with the caller.

9. The electronic device of claim 8, wherein the at least one processor is further configured to store, in a database, information related to the user, a plurality of callers associated with the user, pre-defined categories for each caller, and pre-setting information.

10. The electronic device of claim 8, wherein the command comprises a voice command or a text command.

11. The electronic device of claim 8, wherein the first context data and second context data comprise a purpose of a call, usage data, current activities of the user, a pre-stored user schedule, sensor data, a time of the call, a location of the call, a relationship with the caller, a category of the caller, a previous calling history and conversation details, a voice tone, a speed of talking, and a frequency of calls between the user and the caller.

12. The electronic device of claim 8, wherein the at least one processor is further configured to transmit one or more portion of each of the conversational threads to the caller during a conversation with the caller.

13. The electronic device of claim 8, wherein the at least one processor is further configured to:
    determine at least one the second context data of the incoming call or the pre-setting information.

14. The electronic device of claim 8, wherein the at least one processor is further configured to:
    pick, by a virtual assistant, the incoming call in the conversation with the caller; and
    generate, by the virtual assistant, the one or more conversational threads.

15. An electronic device associated with a user, the electronic device comprising:
    a transceiver;
    a first processor coupled with the transceiver, wherein the first processor is configured to:
       store pre-determined rules,
       receive the pre-determined rules,
       generate device processing commands,
       detect an incoming call from a caller and at least one of a combination of a user input, first context data of the incoming call, and a pre-setting information,
       receive a command from the user, wherein the command is not recognized by the caller, and
       record the command received from the user; and
    a second processor coupled with the first processor, wherein the second processor is configured to:
       store second pre-determined rules,
       receive the second pre-determined rules,
       generate system processing commands,
       analyze the recorded command by detecting at least one of second context data, the pre-setting information, or a pre-defined category,
       generate one or more conversational threads based on the analyzed command, and
       transmit the one or more conversational threads to the caller, during a conversation with the caller.

16. The electronic device of claim 15, wherein the second processor is further configured to store information related to the user, a plurality of callers associated with the user, pre-defined categories for each caller, context related data, and the pre-setting information.

17. The electronic device of claim 15, wherein the second processor is further configured to determine at least one of second context data of the incoming call or the pre-setting information.

18. The electronic device of claim 15, wherein the first processor is further configured to pick the incoming call in conversation with the caller, and generate the one or more conversational threads.

19. The electronic device of claim 18, wherein the first processor is further configured to handle a call received from the caller based on a voice message provided by the user.

20. The electronic device of claim 15, wherein the second processor is further configured to:

authenticate the user by using authentication techniques, the authentication techniques comprising a voice recognition technique, a pattern recognition technique, a password, a fingerprint recognition technique, or a face recognition technique.

* * * * *